United States Patent
Stefan et al.

(10) Patent No.: US 12,551,266 B2
(45) Date of Patent: Feb. 17, 2026

(54) ENDOSCOPIC DEVICE

(71) Applicant: KARL STORZ SE & Co. KG, Tuttlingen (DE)

(72) Inventors: Jochen Stefan, Tuttlingen (DE); Sven Grüner, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 583 days.

(21) Appl. No.: 16/933,500

(22) Filed: Jul. 20, 2020

(65) Prior Publication Data
US 2021/0038288 A1 Feb. 11, 2021

(30) Foreign Application Priority Data
Aug. 5, 2019 (DE) ...................... 10 2019 121 034.8

(51) Int. Cl.
| | |
|---|---|
| *A61B 18/14* | (2006.01) |
| *A61B 34/30* | (2016.01) |
| *A61B 17/00* | (2006.01) |
| *A61B 18/00* | (2006.01) |
| *A61B 18/12* | (2006.01) |

(52) U.S. Cl.
CPC .......... *A61B 18/1445* (2013.01); *A61B 34/30* (2016.02); *A61B 2017/00367* (2013.01); *A61B 2018/00077* (2013.01); *A61B 2018/00083* (2013.01); *A61B 2018/00589* (2013.01); *A61B 2018/126* (2013.01); *A61B 2034/301* (2016.02)

(58) Field of Classification Search
CPC ...... A61B 2017/2905; A61B 2034/301; A61B 34/30; A61B 18/1445
See application file for complete search history.

(56) References Cited

U.S. PATENT DOCUMENTS

| | | | |
|---|---|---|---|
| 2003/0083654 A1* | 5/2003 | Chin | A61B 18/1492 606/41 |
| 2004/0082945 A1* | 4/2004 | Clague | A61B 18/14 606/32 |
| 2010/0094289 A1 | 4/2010 | Taylor et al. | |
| 2015/0032150 A1* | 1/2015 | Ishida | A61B 18/1482 606/205 |
| 2020/0222112 A1* | 7/2020 | Hancock | A61B 18/1815 |

FOREIGN PATENT DOCUMENTS

| | | |
|---|---|---|
| DE | 10 2011 007 122 A | 10/2012 |
| DE | 10 2011 081 464 A1 | 2/2013 |

* cited by examiner

*Primary Examiner* — Linda C Dvorak
*Assistant Examiner* — Ryan T Clark
(74) *Attorney, Agent, or Firm* — Honigman LLP

(57) ABSTRACT

The present application is directed to an endoscopic device with a shaft which has at least one segment that can be deflected in at least one plane, with an end effector which is arranged on an end segment of the shaft and which includes at least one tool piece, with an actuating unit that is designed for actuating the end effector and which extends at least in part through the shaft and is embodied flexible, at least in segments. The actuating unit has at least one electrical pole conductor for providing at least one electrical potential for the tool piece.

11 Claims, 17 Drawing Sheets

ENDOSCOPIC DEVICE

PRIOR ART

Figure 1:
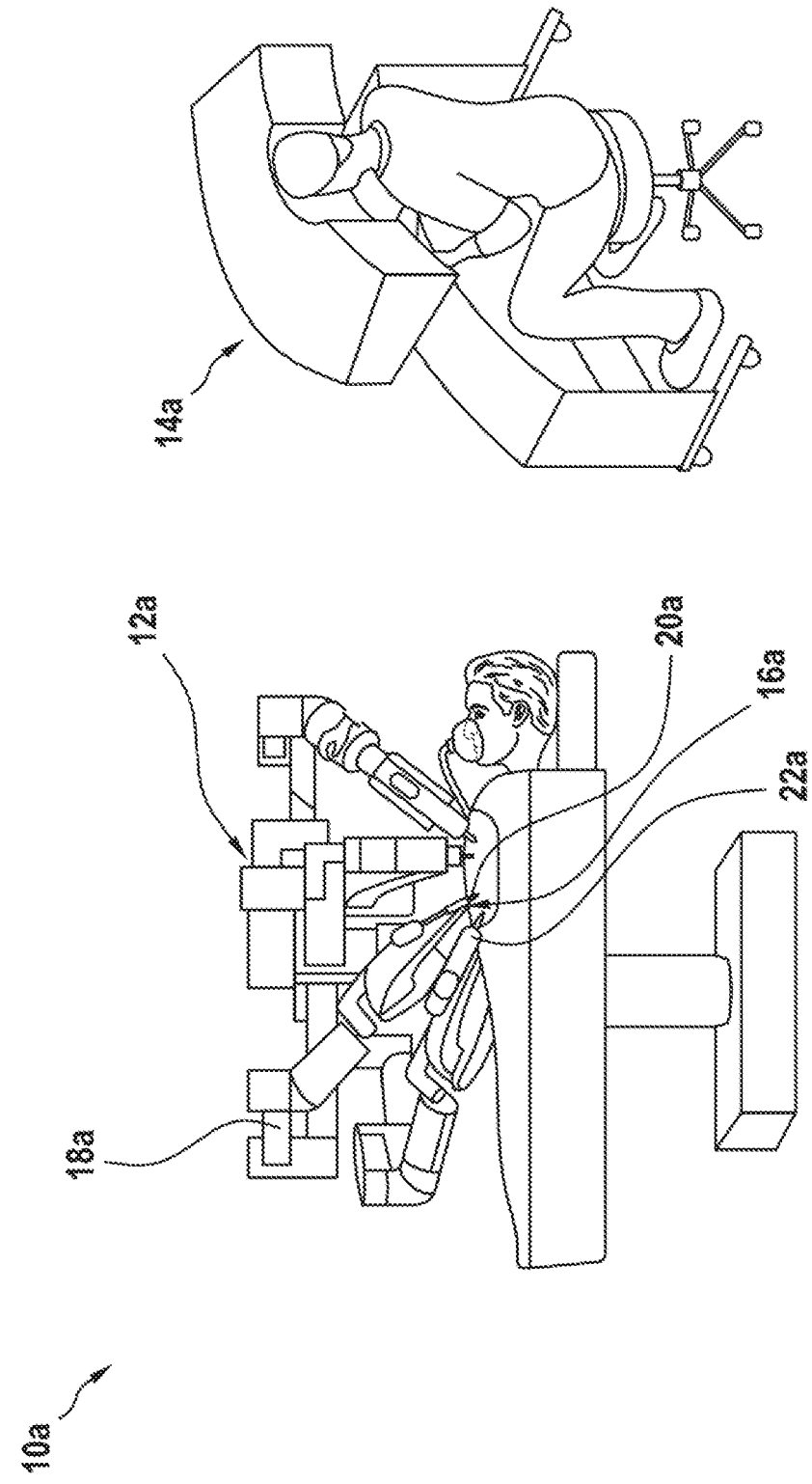

The invention relates to an endoscopic device, an endoscope and/or endoscopic instrument with an endoscopic device, a surgical system with an endoscopic devive, and a method for operating and/or producing an endoscopic device.

An endoscopic device with a shaft which has at least one segment which can be deflected in at least one plane, with an end effector which is arranged on an end segment of the shaft and which comprises at least one tool element, with an actuating unit designed for actuating the end effector and extending at least in part through the shaft and embodied flexible, at least in segments, has been proposed.

The object of the invention is in particular to provide a generic device with improved properties with regard to functionality. The object is achieved according to the invention implemented in an endoscope and/or endoscopic instrument with an endoscopic device, a surgical system with an endoscopic device and a method for operating and/or producing an endoscopic device, advantageous embodiments and refinements of the invention can be found in the subclaims.

Advantages of the Invention

The invention proceeds from an endoscopic device with a shaft which has at least one segment which can be deflected in at least one plane, with an end effector which is arranged on an end segment of the shaft and which comprises at least one tool element, with an actuating unit extending at least in part through the shaft and embodied flexible, at least in segments.

It is proposed that the actuating unit has at least one electrical pole conductor for providing at least one electrical potential for the tool element.

In this way, an endoscopic device can advantageously be equipped with a coagulation function. Furthermore, deflectability with simultaneous electrical conductivity can advantageously be improved. A particularly safe, compact, and space-saving integration of a coagulation function in an endoscopic device can also be advantageously achieved.

An "endoscopic device" shall be construed to mean, in particular, a preferably functional component, in particular a subassembly and/or a structural and/or a functional component of an endoscopic instrument and/or an endoscope. Alternatively, the endoscopic device can be an endoscope and/or an endoscopic instrument, at least in part, preferably at least to a large extent, and particularly preferably completely. The term "endoscopic" shall also be construed to mean minimally invasive in particular. The expression "at least to a large extent" should in particular mean at least 55%, preferably at least 65%, preferably at least 75%, particularly preferably at least 85%, and very particularly preferably at least 95%, and advantageously completely, in particular with reference to a volume and/or a mass of an object. The endoscopic device is, designed, for example, at least partially and preferably at least in large part, to be inserted into an in particular artificial and/or natural opening, in particular a bodily orifice, in order to undertake treatment and/or examination there. An endoscopic instrument can be, for example, an endoscopic nipper instrument, an endoscopic scissors instrument, an endoscopic scalpel instrument, an endoscopic clamp instrument, or the like. It is possible for the endoscopic device to be designed to provide at least one, two, or more electrical potentials, for example in order to incise tissue, close tissue, coagulate tissue, and/or the like. "Designed" shall in particular be construed to mean specially programmed, provided, embodied, formed and/or equipped. The fact that an object is designed for a specific function should in particular be construed to mean that the object satisfies and/or carries out this specific function in at least one application and/or operating mode. If the endoscopic device has, for example, at least one shaft, the latter is designed to be introduced, at least in part and preferably at least in large part, into an artificial and/or natural opening, in particular a bodily orifice. The shaft comprises, for example, at least one end segment and/or a further end segment, for example the end segment being a distal end segment and/or the further end segment being a proximal end segment. "Distal" shall in particular be construed to mean facing a patient during use and/or facing away from a user. "Proximal" shall in particular be construed to mean facing away from a patient during use and or facing a user. The shaft has, for example, a primary extension axis. A primary extension axis of an object shall be construed to mean an axis which runs through the geometric center and/or center of mass of the object and is at least substantially parallel to a main extension directly of the object.

The "main direction of extension" of an object shall be construed to mean in particular a direction that runs parallel to a longest edge of a smallest imaginary cuboid that still completely surrounds the object. A longitudinal extension, for example of the shaft, is identical to its main extension direction. "At least substantially parallel" shall herein be construed to mean in particular an orientation of a direction relative to a reference direction, in particular in a plane, wherein the direction and the reference direction are at an angle of 0°, in particular taking into account a maximum deviation of less than 8°, advantageously less than 5°, and particularly advantageously less than 2°. A width can be measured at least substantially perpendicular to the longitudinal extension. "At least substantially perpendicular" herein shall in particular be construed to mean an orientation of a direction relative to a reference direction, in particular in a plane, wherein the direction and the reference direction are at an angle of 90°, in particular taking into account a maximum deviation of less than 8°, advantageously less than 5°, and particularly advantageously less than 2°. The endoscopic device can have a plurality of components which can be at least substantially identical to one another. "At least substantially identical" shall be construed to mean identical or identical excepting assembly and/or manufacturing tolerances. The endoscopic device can be formed at least in part in one piece. The fact that "an object and a further object are formed/connected at least in part in one piece" shall be construed in particular to mean that at least an element and/or part of the object and at least an element and/or part of the further object are formed/connected in one piece. "In one piece" shall be construed in particular to mean joined at least in a bonded fit, for example using a welding process, an adhesive process, a casting-on process, and/or another process which appears reasonable to the person skilled in the art. Furthermore, in one piece can also be construed to mean integral. "Integral" shall be construed to mean, in particular, molded in one piece, such as, for example, by production from a casting and/or by production in a single or multi-component injection molding process and advantageously from a single blank. Components of the endoscopic device should be connected to one another, at least in part, in a positive and/or non-positive fit. A "non-positive and/or positive fit" shall be construed in particular to mean connected, preferably detachably connected, wherein a holding force between two objects is preferably transmitted via a geometrical engagement of the structural components with one another and/or via a frictional force which preferably acts between the objects. Alternatively or in addition, components of the endoscopic device can be joined to one another in a bonded fit. "Bonded fit" shall be construed to mean in particular that the objects are held together by atomic or molecular forces, such as, for example, with soldering, welding, gluing, and/or vulcanizing. Furthermore, the endoscopic device can be part of a surgical system. A surgical system shall be construed to be in particular a system which designed to carry out a surgical procedure, for example an endoscopic and/or minimally invasive procedure and which comprises at least one surgical robot. The surgical robot can comprise at least one surgical robot arm or a plurality of surgical robot arms. The endoscopic device can be controllable and/or actuatable with the surgical robot, in particular the surgical robot arm. The endoscopic device can be detachably connectable to the surgical robot, for example, to enable exchange and/or cleaning of the endoscopic device. Furthermore, the surgical system can comprise at least one control device which is designed for manual and/or automated control of the surgical robot.

The shaft can have a deflectable segment. For deflecting the shaft, the endoscopic device can have at least one deflection mechanism. The deflection mechanism is designed in particular to mechanically deflect the deflectable segment of the shaft. The shaft can be deflected in particular in at least one further plane which differs from the at least one plane. For example, the further plane can be perpendicular to the plane. It is also possible for the shaft to be deflected in any plane along its circumference.

In particular, the deflection mechanism can comprise at least one, and preferably a plurality of, first connecting links which can be embodied to be at least substantially identical to one another. In particular, the deflection mechanism can comprise at least two and preferably a plurality of second connecting links which can be approximately at least substantially identical to one another. The first connecting links and the second connecting links can be arranged alternating in series. Except for edge regions of the deflection mechanism, one connecting link can be adjacent to two second connecting links or vice versa. Furthermore, it is possible for at least one second connecting link to define an edge region of the deflection mechanism or for two second connecting links to define opposing edge regions of the deflection mechanism. A second connecting link can be embodied and/or connected, at least in part, in one piece, to an end segment of the shaft and/or to the end effector head. A first connecting link is enclosed by a second connecting link, in particular from two opposing sides. Furthermore, two first connecting links each engage in a second connecting link from two opposing sides. The first connecting link and the second connecting link can be connected to one another like a ball joint. In particular, the first connecting link has at least one ball head and the second connecting link has at least one ball socket, and these cooperate in the manner of a ball joint.

The first connecting link is designed as a rotating body. The first connecting link has a first rotational symmetry axis. The first connecting link has in particular an olive-like shape. The second connecting link is embodied as a rotating body. The second connecting link has a second rotational symmetry axis. The second connecting link has in particular a disc-like shape. A "linear configuration distance" shall be construed in particular to mean a configuration of at least the first connecting link and the second connecting link, in particular of all first and second connecting links, in which configuration the first rotational symmetry axis and the second rotational symmetry axis, in particular all rotational symmetry axes of the connecting links, are oriented at least substantially parallel to one another or are even identical to one another. A "deflection configuration" shall be construed in particular to mean a configuration of at least the first connecting link and the second connecting link, in particular of all first and second connecting links, in which configuration the first rotational symmetry axis and the second rotational symmetry axis, in particular all rotational symmetry axes of the connecting links, are arranged at an angle to one another and are preferably offset to one another by an equal angle. "At an angle" shall be construed in particular to mean different from being arranged at least substantially parallel.

The end effector and the actuating unit can additionally be coupled to one another electrically, for example in order to transmit at least one electrical potential from the actuating unit to the end effector, in particular to a tool piece of the end effector. The actuating unit has in particular at least one inner cable which is preferably embodied flexible. In particular, the inner cable can be embodied flexible across an entire extension of the actuating unit. It is possible for the inner cable to be embodied to be electrically conductive, for example in order to transmit an electrical potential. Furthermore, the actuating unit can have at least one outer cable which can advantageously be arranged coaxially surrounding the inner cable. In particular, the outer cable can be designed to be flexible across at least a large extent of an extension of the actuating unit. It is possible for the outer cable to be embodied to be electrically conductive, for example in order to transmit a further electrical potential. The outer cable could be embodied as a tube. For example, the outer cable could be embodied as a fabric.

The control element of the deflection mechanism is embodied in particular pliable. A "pliable component" shall be construed in particular to mean a component, preferably an elongate component, which has pliable properties at least in one direction perpendicular to a main direction of extension. This shall preferably be understood to mean in particular a dimensionally unstable component. Particularly preferably, this shall be understood to mean, in particular, a component which, in an extended state, exerts a counterforce that acts parallel to a pressure force main direction of extension and that has a counterforce that is less than a weight force of the component. The counterforce is preferably a maximum of 70%, preferably a maximum of 50%, and particularly preferably a maximum of 30% of a weight force. An "elongate component" shall be construed in particular to mean a component which has a transverse extension which is several times smaller than a longitudinal extension. "Several times smaller" shall be construed to mean in particular at least 3 times smaller, preferably at least 5 times smaller, and particularly preferably at least 10 times smaller.

It is proposed that the electrical pole conductor is embodied as a stranded wire or as a solid wire which is also designed for mechanical force transmission. A mechanically stable pole conductor can advantageously be provided which is used on the one hand for mechanical force transmission and/or for the transmission of the electrical potential.

In order to reduce installation space and/or to improve stability, in particular tensile strength, it is proposed that the electrical pole conductor is designed as an inner conductor. The electrical pole conductor forms in particular the inner cable of the actuating unit.

It is further proposed that the actuating unit comprises at least one electrical insulator which coaxially surrounds the electrical pole conductor. A voltage which derives in particular from the applied electrical potential can advantageously be used. In particular, it can be avoided that a short circuit between the electrical potential and a ground occurs unintentionally. The electrical insulator is embodied from at least one insulating material. The insulating material can have a CTI value of at least 150, preferably at least 300, preferably at least 450, and particularly preferably at least 600. The insulating material can be a plastic. For example, the insulating material can be polyimide, polyethylene, polyester resin, polytetrafluoroethylene, polybutylene terephthalate, hexafluoropropylene copolymer, and/or perfluoroalkoxy polymer. The insulating material could preferably be a cycloolefin copolymer.

In addition, it is proposed that the actuating unit has at least one further electrical pole conductor for providing at least one further electrical potential. It is advantageously possible to apply the endoscopic device in a bipolar manner. In particular, it can be avoided that a short circuit occurs unintentionally between the electrical potential and a ground. In particular, a working voltage can be set by applying the electrical potential and the further electrical potential in a targeted manner.

In order to reduce installation space and/or to further improve stability, in particular tensile strength, it is proposed that the further electrical pole conductor coaxially surrounds the electrical pole conductor. It is proposed that the further electrical pole conductor be designed as an outer conductor. The electrical pole conductor forms in particular the outer cable of the actuating unit.

It is further proposed that the actuating unit comprises at least one insulator, in particular the aforementioned insulator, which coaxially surrounds the electrical pole conductor and which is arranged between the electrical pole conductor and the further electrical pole conductor. A voltage which derives in particular from the applied electrical potential can advantageously be increased. In particular it is possible to prevent an undesired short circuit from occurring between the further electrical potential and/or the further electrical potential and a ground.

It is further proposed that the actuating unit comprises at least one further electrical insulator which coaxially surrounds the further electrical pole conductor. A voltage which derives in particular from the further electrical potential applied can advantageously be increased. In particular, it is possible to prevent an undesired short circuit from occurring between the further electrical potential and a ground. The further insulator can be at least substantially identical to the insulator.

It is further proposed that the further electrical pole conductor be embodied in a tube-like manner, in particular from a mesh. This advantageously allows a further reduction in installation space and/or allows stability, in particular tensile strength, to be increased further.

In addition, it is proposed that the electrical pole conductor have a main extension which is greater than a further main extension of the further electrical pole conductor. In this way, a cascade-like connection of the electrical pole conductor and the further electrical pole conductor can be achieved.

It is further proposed that the actuating unit in a segment different from a flexible segment comprises a non-flexible reinforcement which surrounds at least one pole conductor. This advantageously allows a further reduction in installation space and/or allows stability, in particular tensile strength, to be further increased. The reinforcement can be embodied in a tube-like manner. It is possible for the further electrical insulator to embody the reinforcement. Alternatively, the reinforcement can be embodied from a metal tube, which in particular could be coated with the insulating material, It is further proposed that the endoscopic device comprises at least one movement converter which mechanically couples the end effector and the actuating unit to one another and electrically couples at least one electrical pole conductor to the tool element. A coagulation function can advantageously be further improved. That the "movement converter" at least mechanically couples the end effector and the actuating unit to one another shall be understood in particular to mean that the movement converter movably connects the end effector and the actuating unit to one another. Advantageously, the movement converter also electrically couples the end effector and the actuating unit to one another. Only part of the movement converter in particular is electrically conductive, in order in particular to prevent a short circuit with other parts and components. The movement converter electrically connects, in particular permanently, the electrical pole conductor and/or the further electrical pole conductor to the tool piece and/or the further tool piece.

It is also proposed that the endoscopic device of at least one deflection mechanism, which is designed for deflecting the deflectable segment of the shaft and, arranged in series, comprises at least a first connecting link and at least a second connecting link which cooperates with the first connecting link to cause deflection. It is advantageously possible to achieve a deflectable shaft in combination with an actuating unit which extends through the shaft and which provides at least one electrical potential.

Subject matter of the present disclosure shall not be limited to the application and embodiment described above. In particular, for satisfying a manner of functioning described herein, the subject matter of the present disclosure can have a number of individual elements, components, units, and method steps that differ from the number of individual elements, components, units, and method steps cited herein. In addition, for the value ranges specified in this disclosure, values lying within the stated limits are also to be regarded as disclosed and can be used as desired.

If there is more than one copy of a particular object, only one of them is provided with a reference symbol in the figures and in the description. The description of this copy can be applied accordingly to the other copies of the object.

DRAWINGS

Further advantages result from the following description of the drawings. Exemplary embodiments according to the disclosure are shown in the drawings. The drawings, description, and claims contain numerous features in combination. The person skilled in the art will usefully also consider the features individually and combine them into meaningful further combinations.

Figure 2:
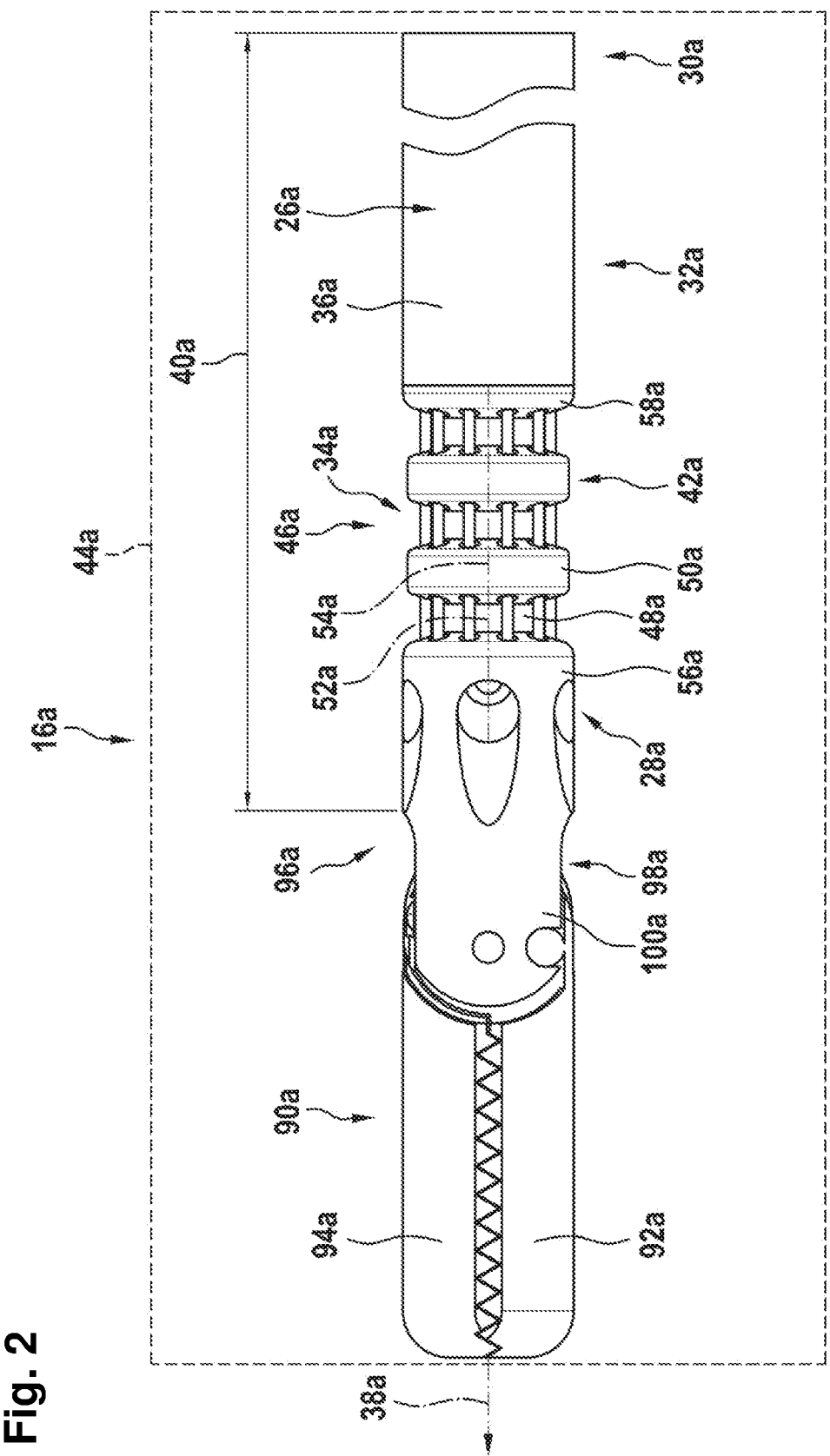
Figure 3:
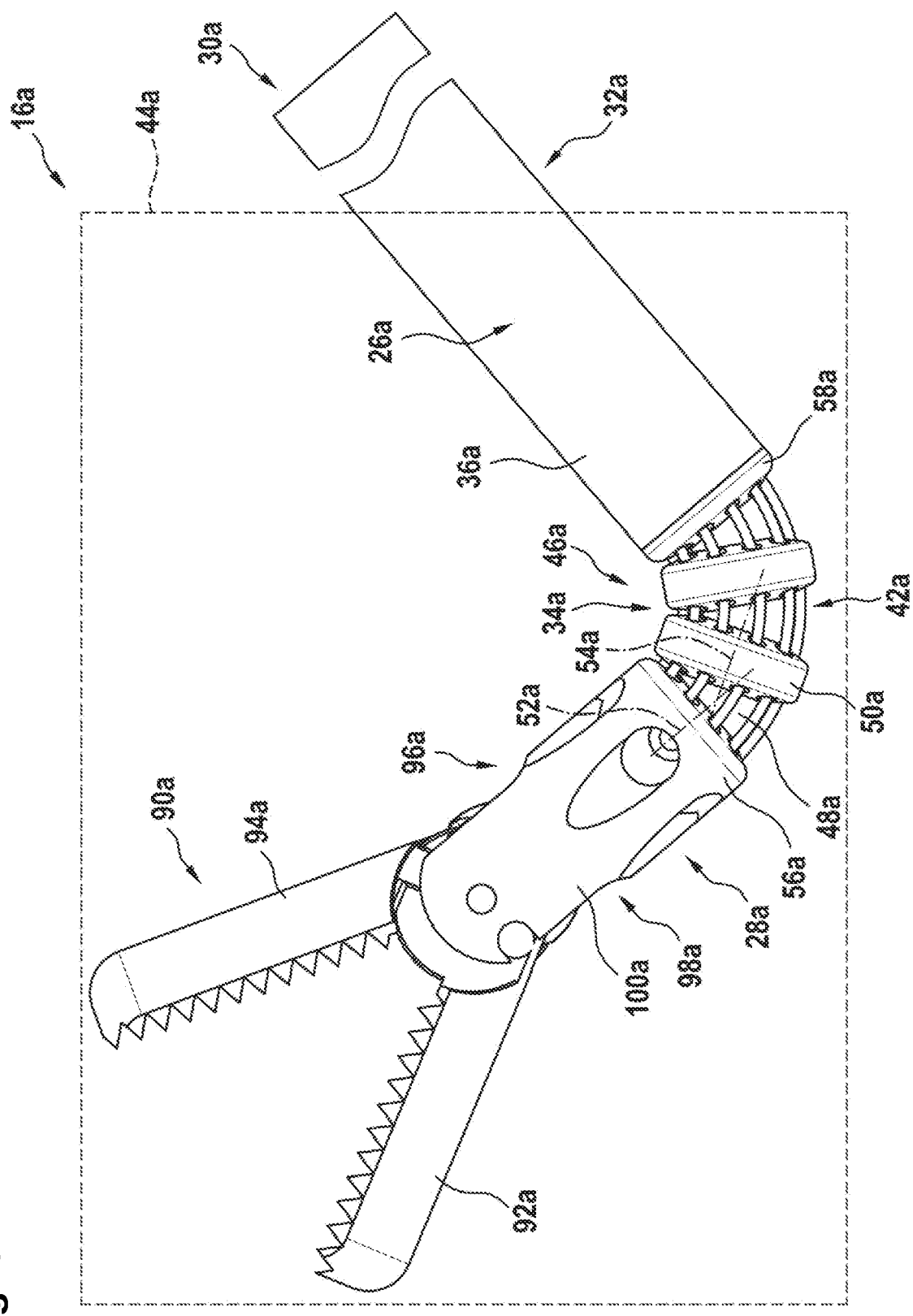
Figure 4:
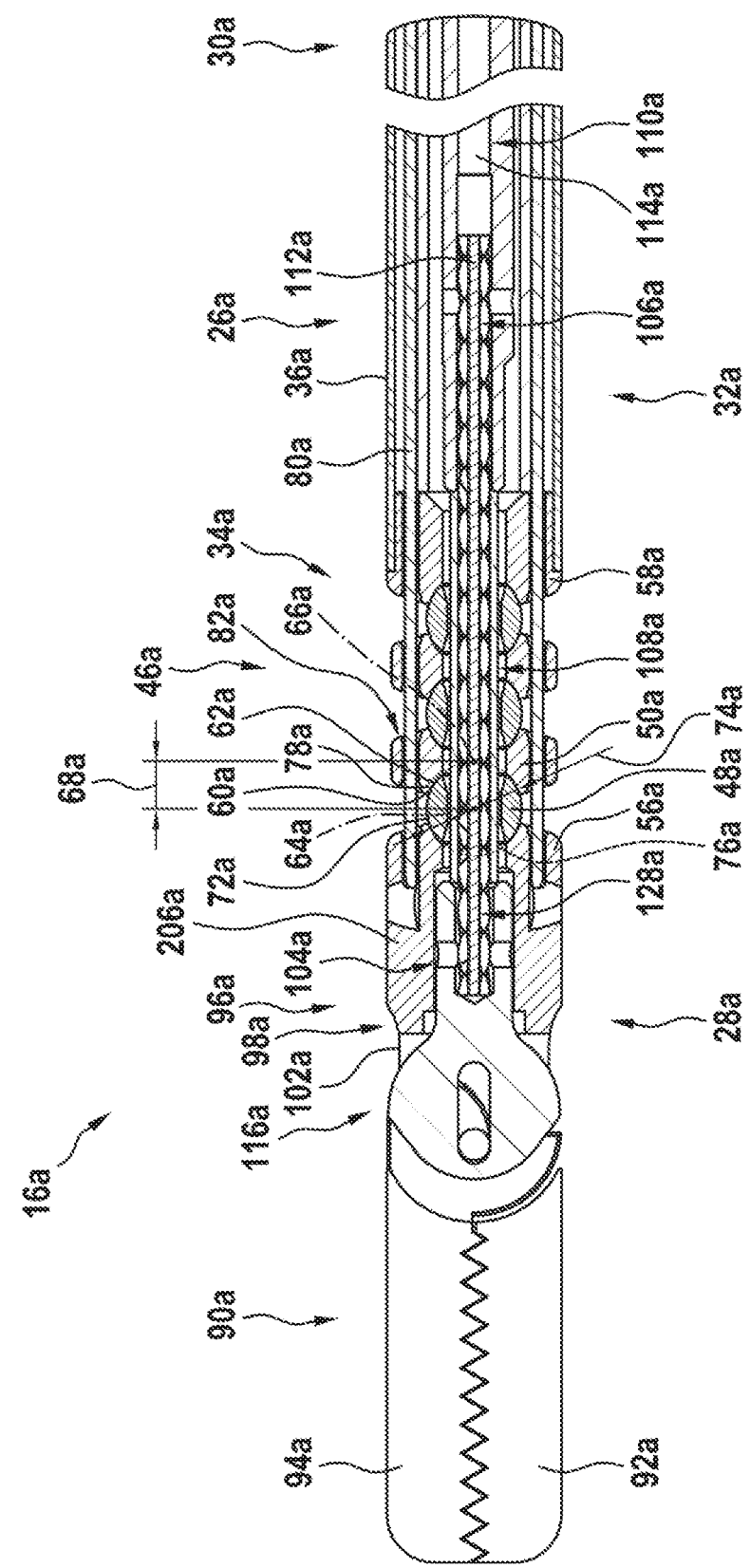
Figure 5:
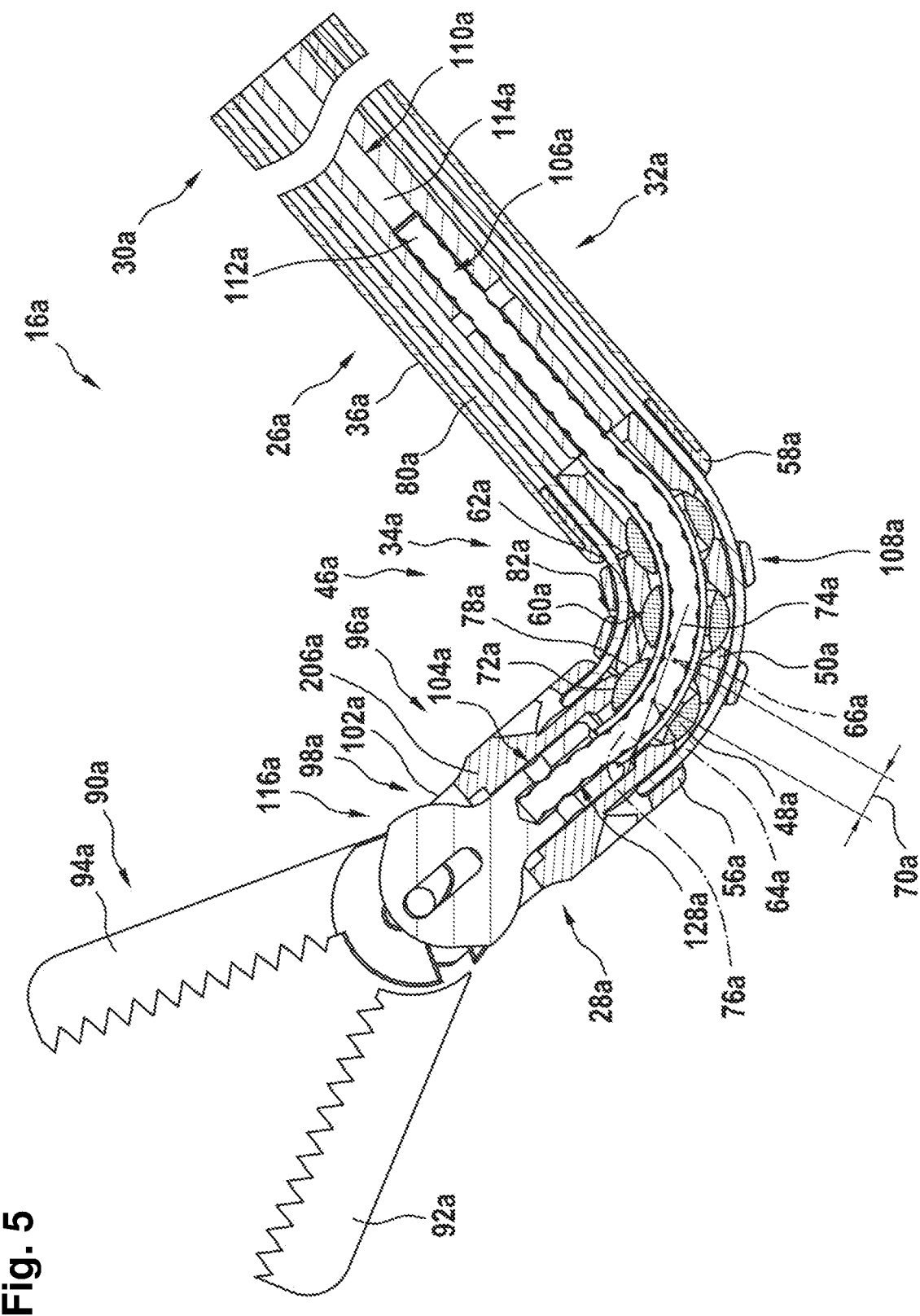
Figure 6:
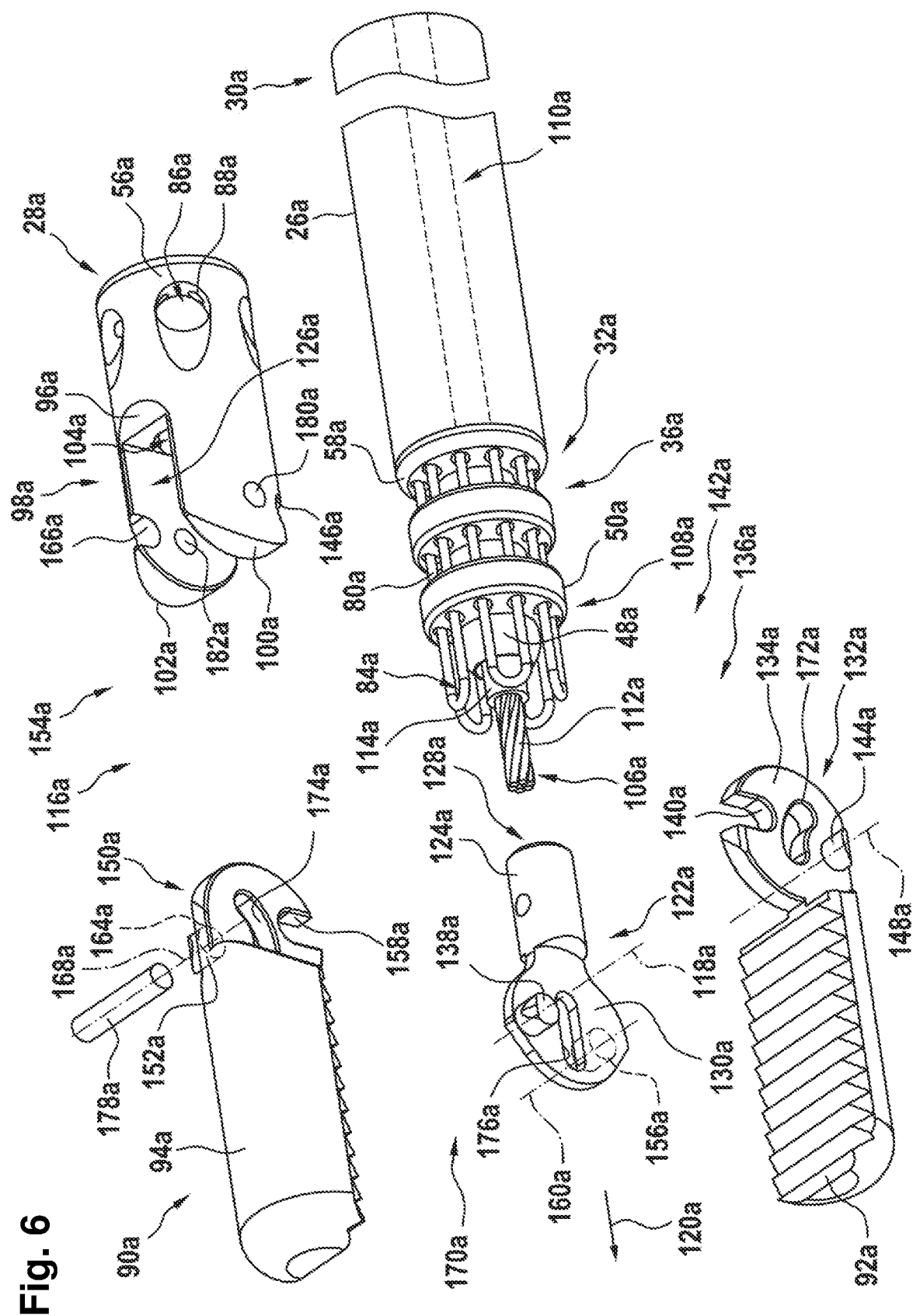
Figure 7:
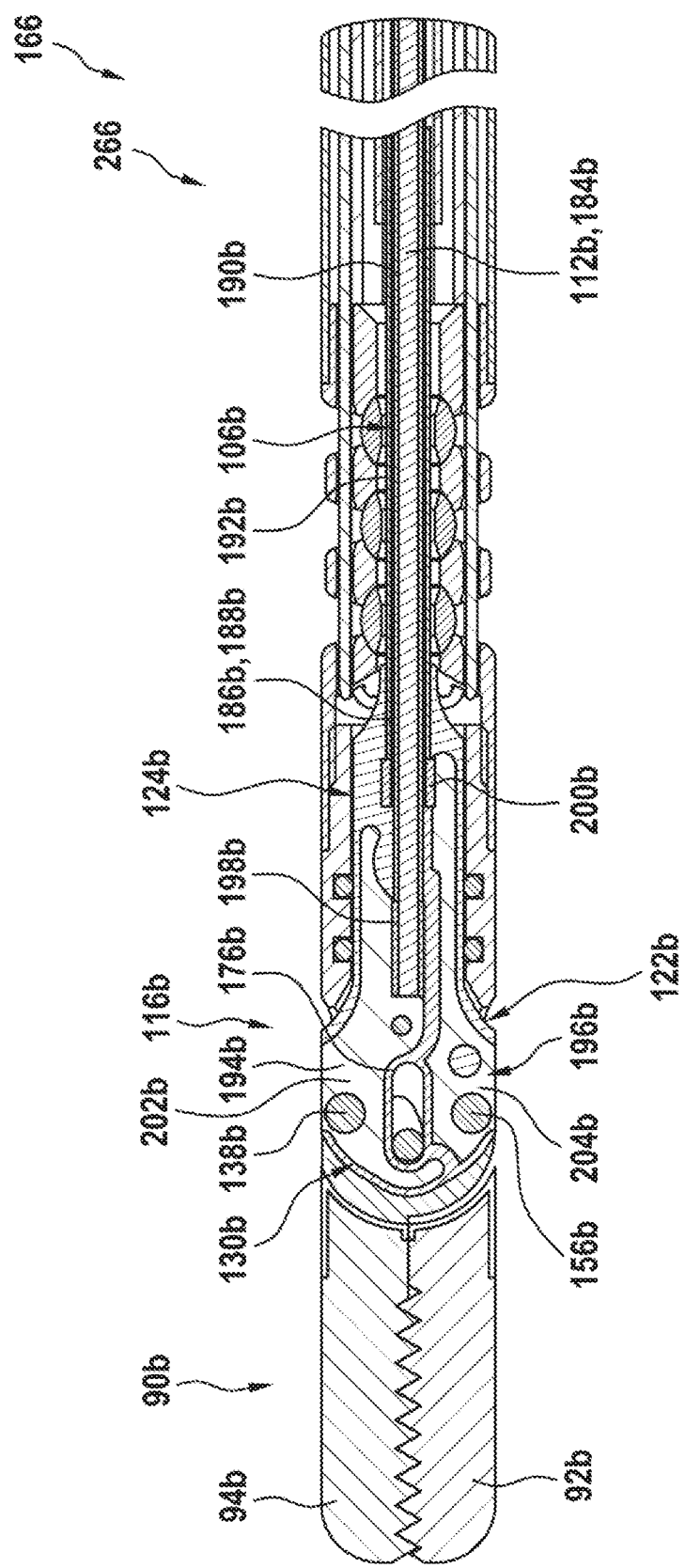
Figure 8:
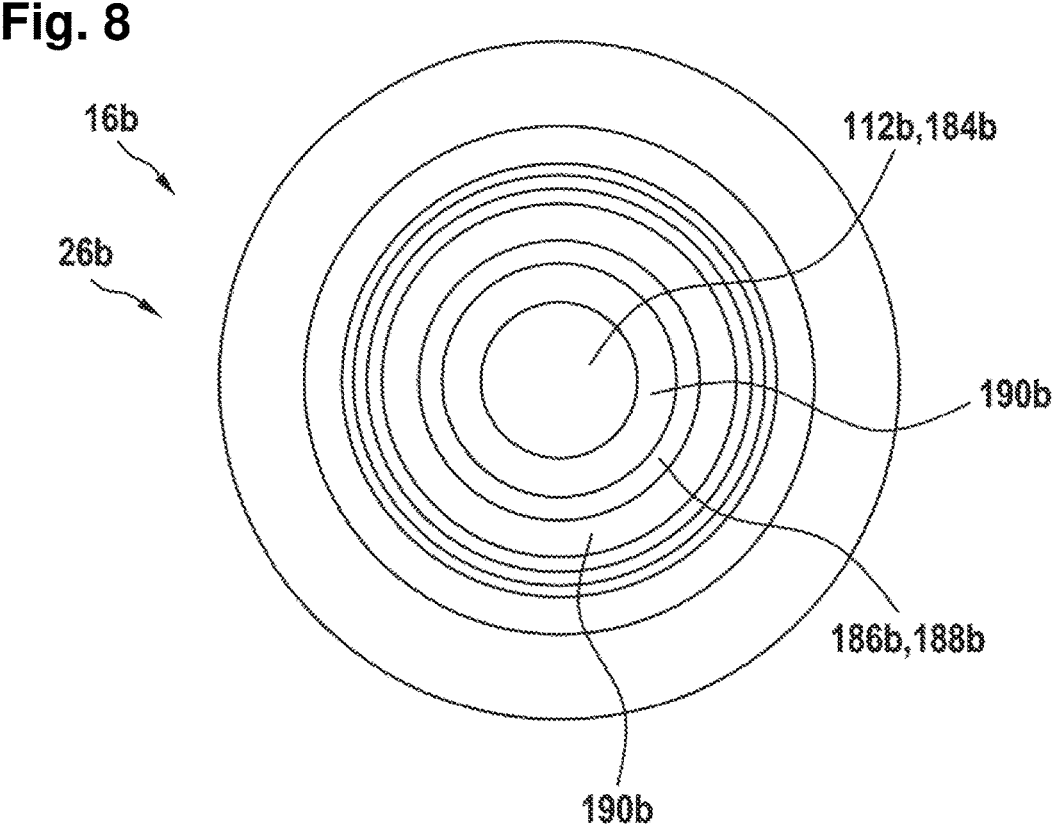
Figure 9:
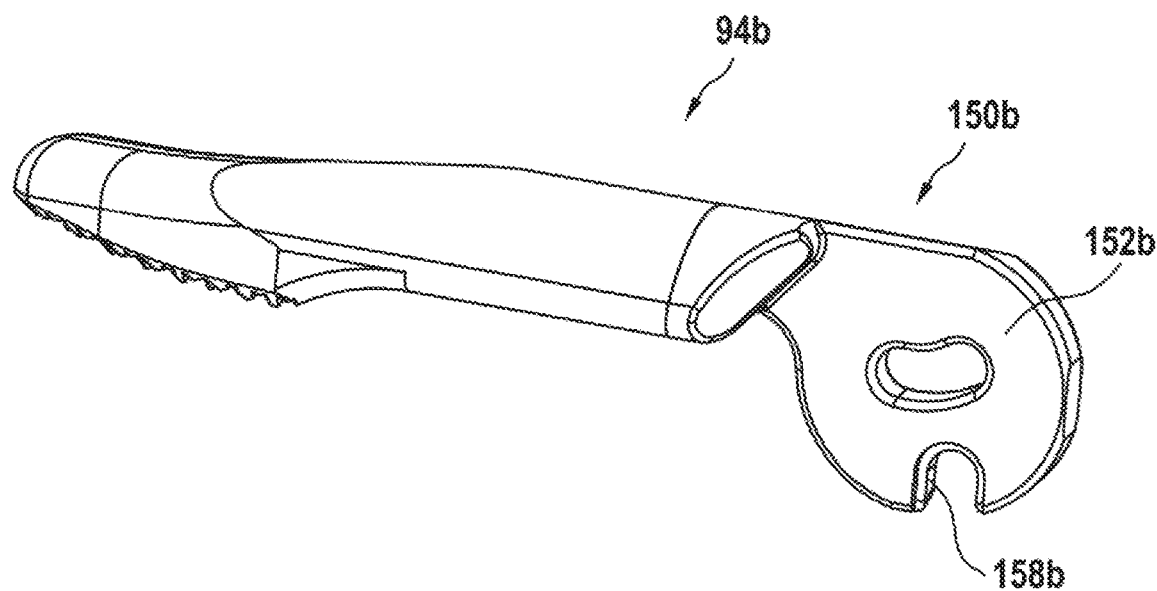
Figure 10:
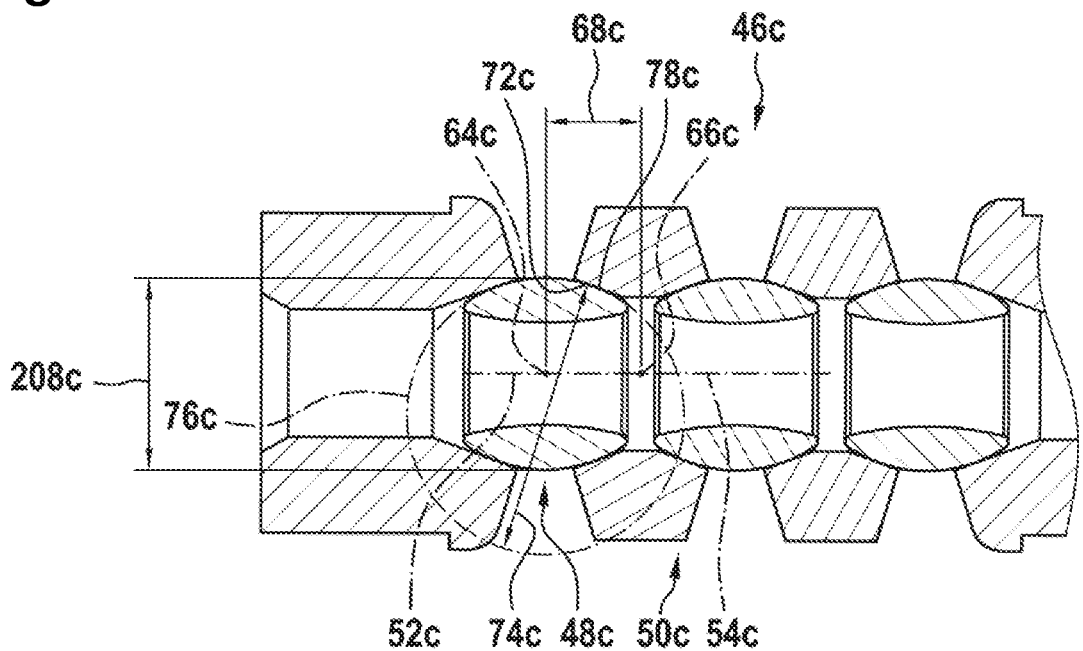
Figure 11:
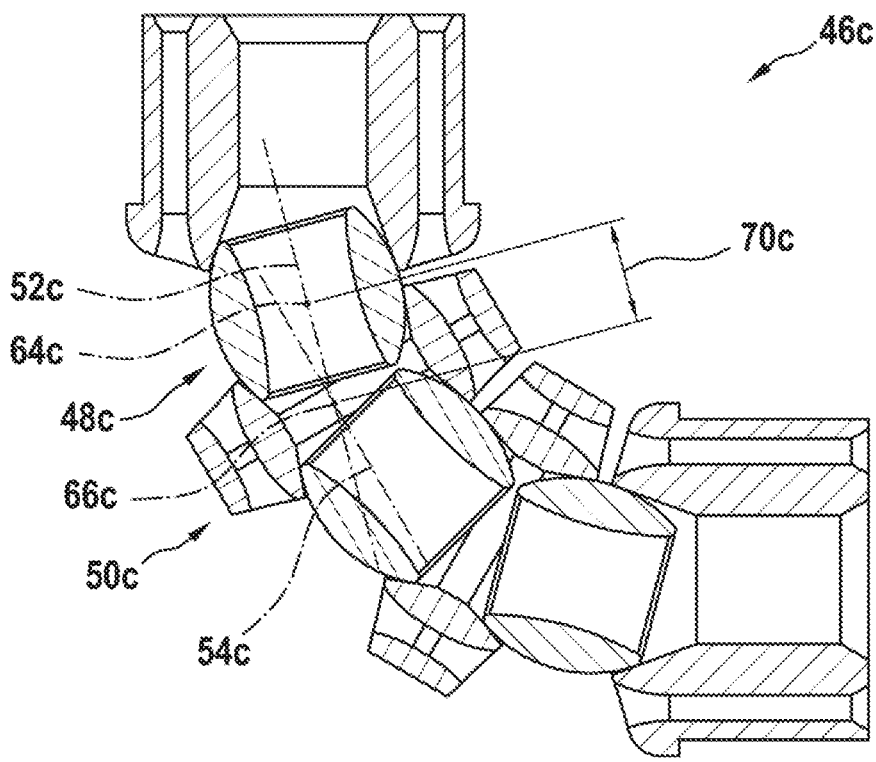
Figure 12:
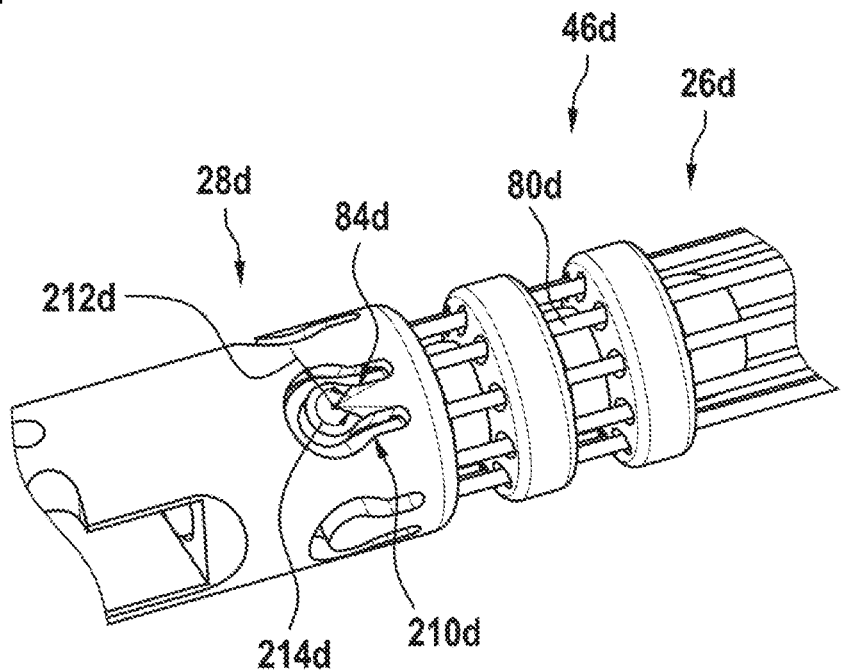
Figure 13:
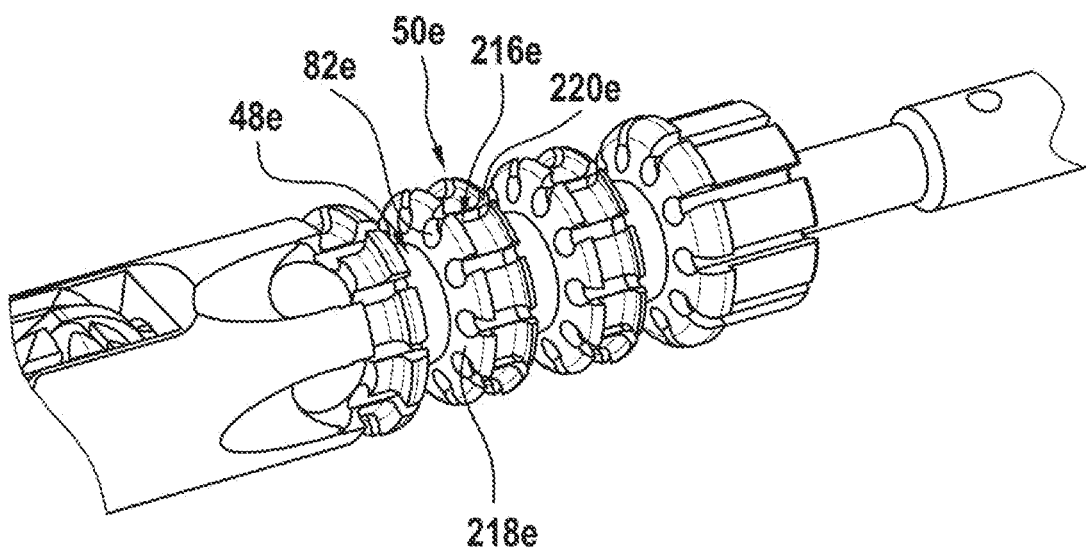
Figure 14:
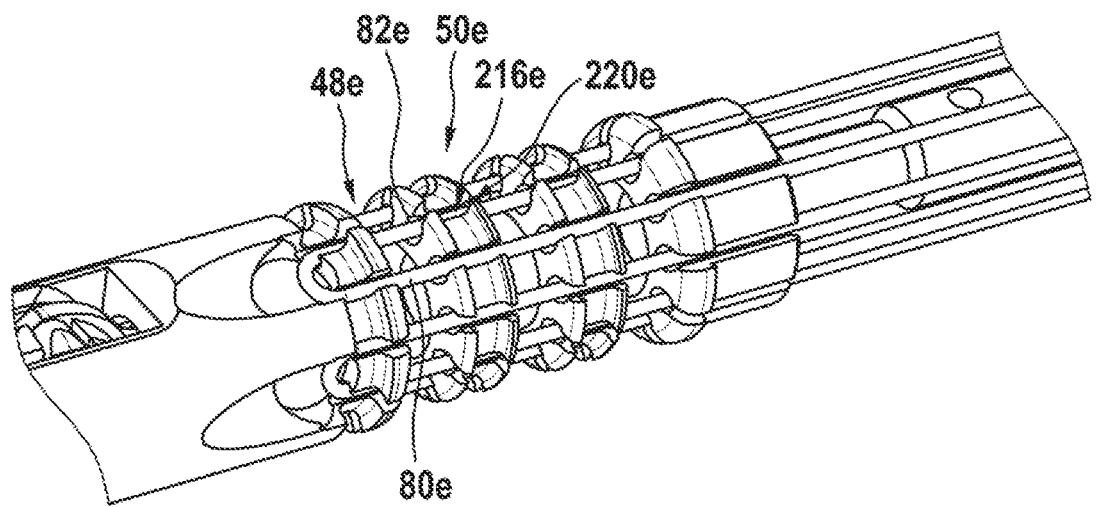
Figure 15:
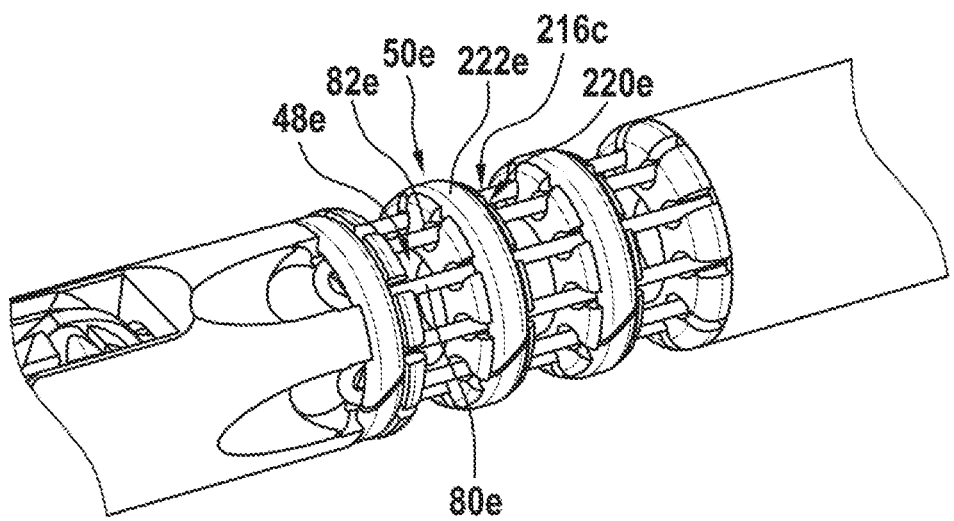
Figure 16:
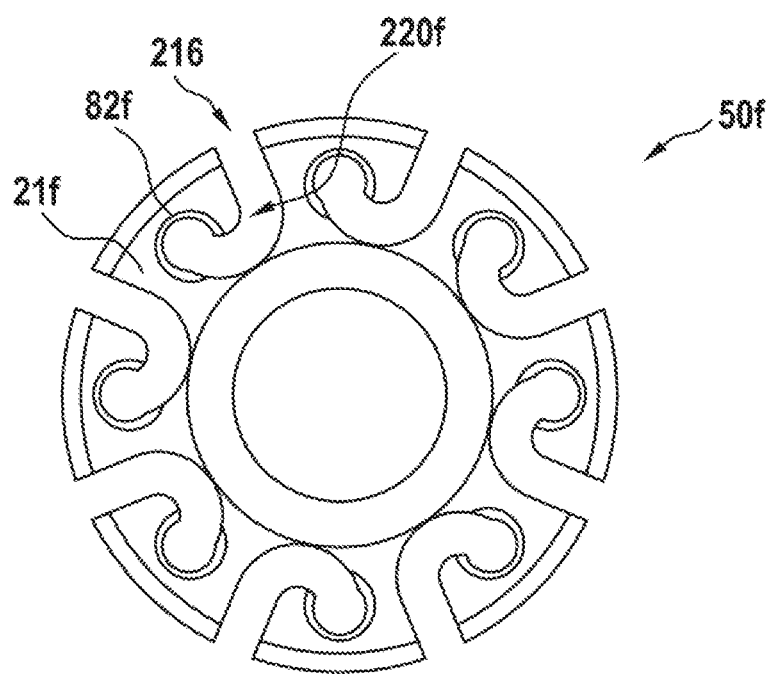
Figure 17:
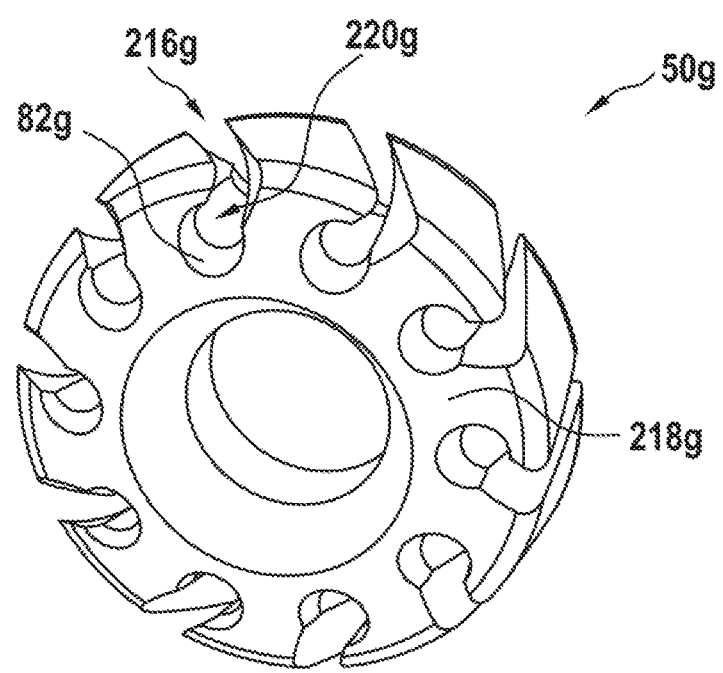
Figure 18:
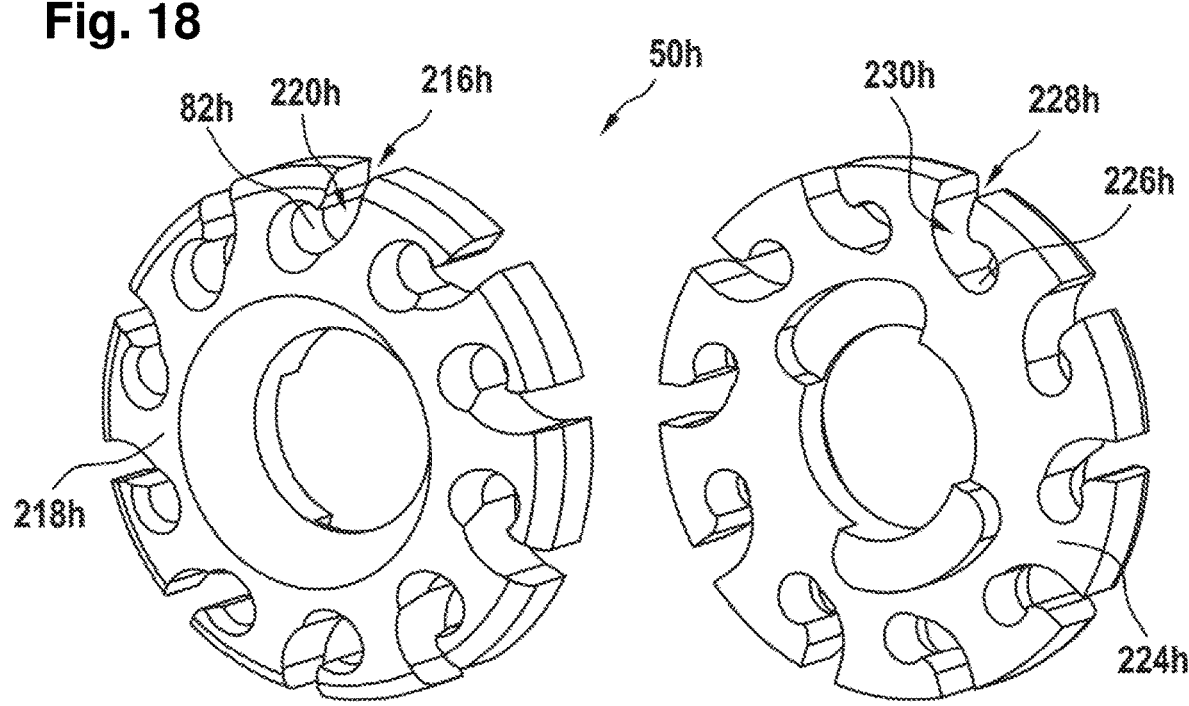
Figure 19:
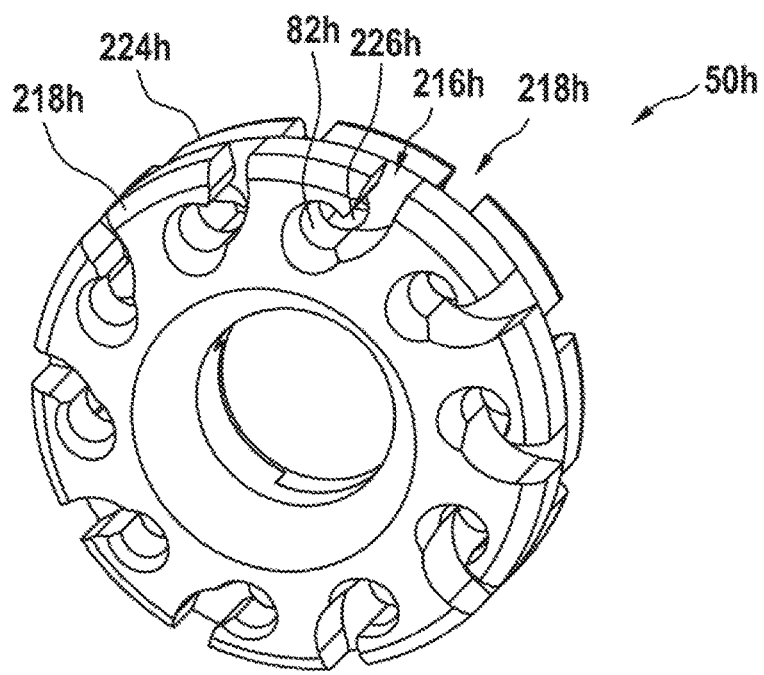
Figure 20:
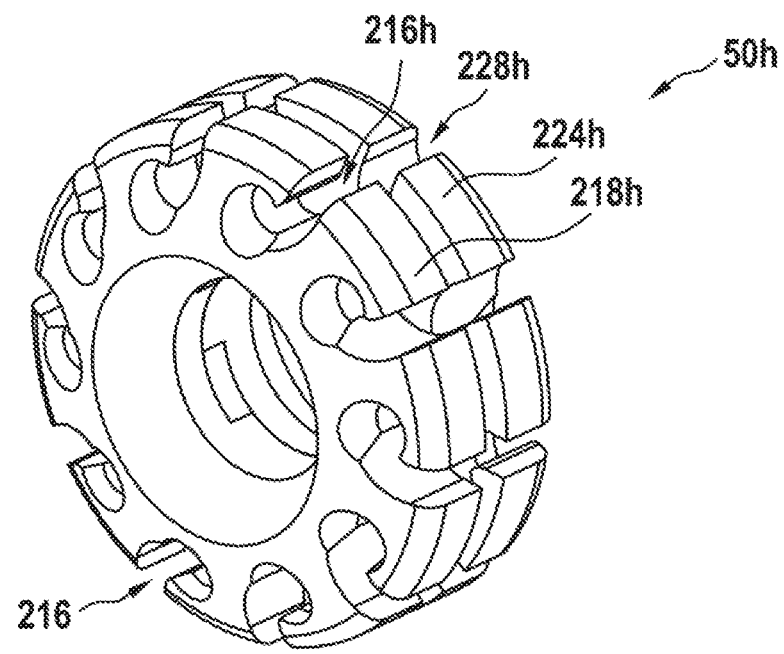
Figure 21:
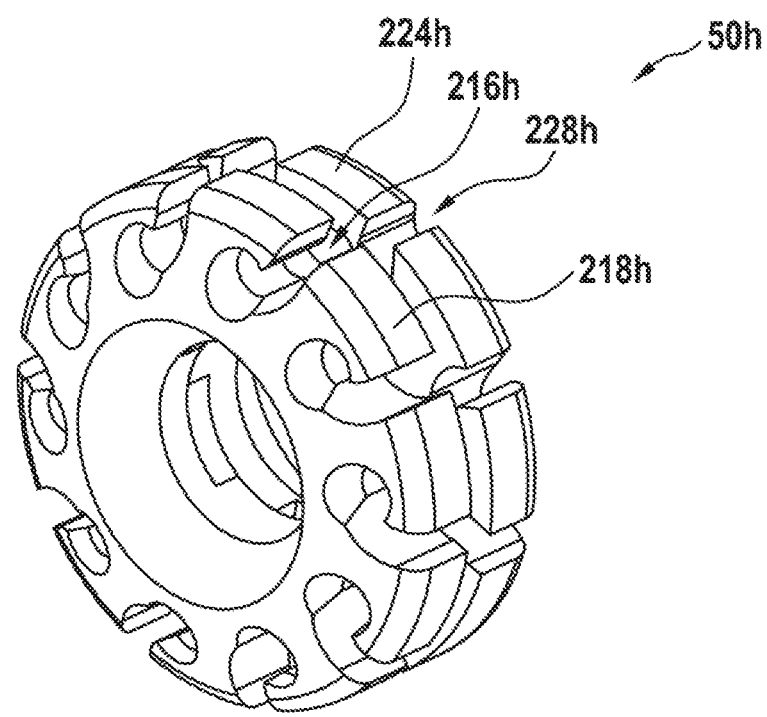
Figure 22:
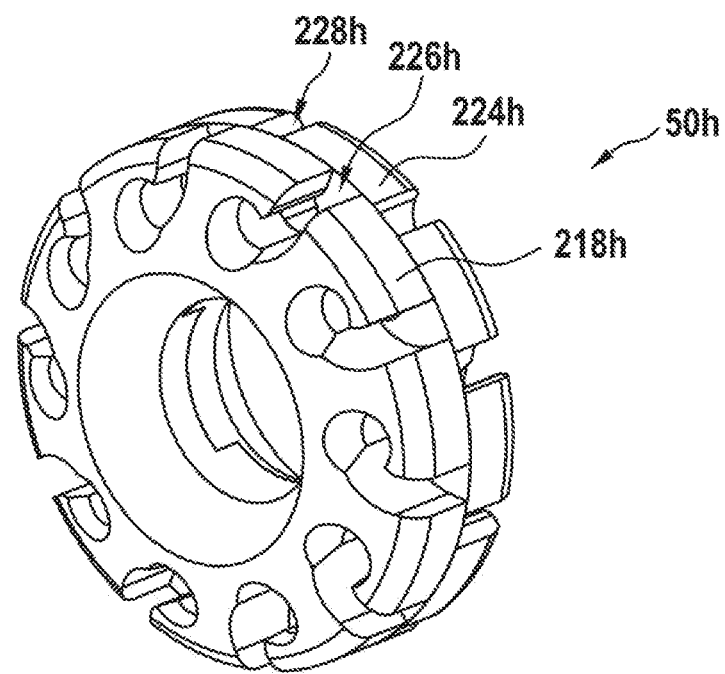
Figure 23:
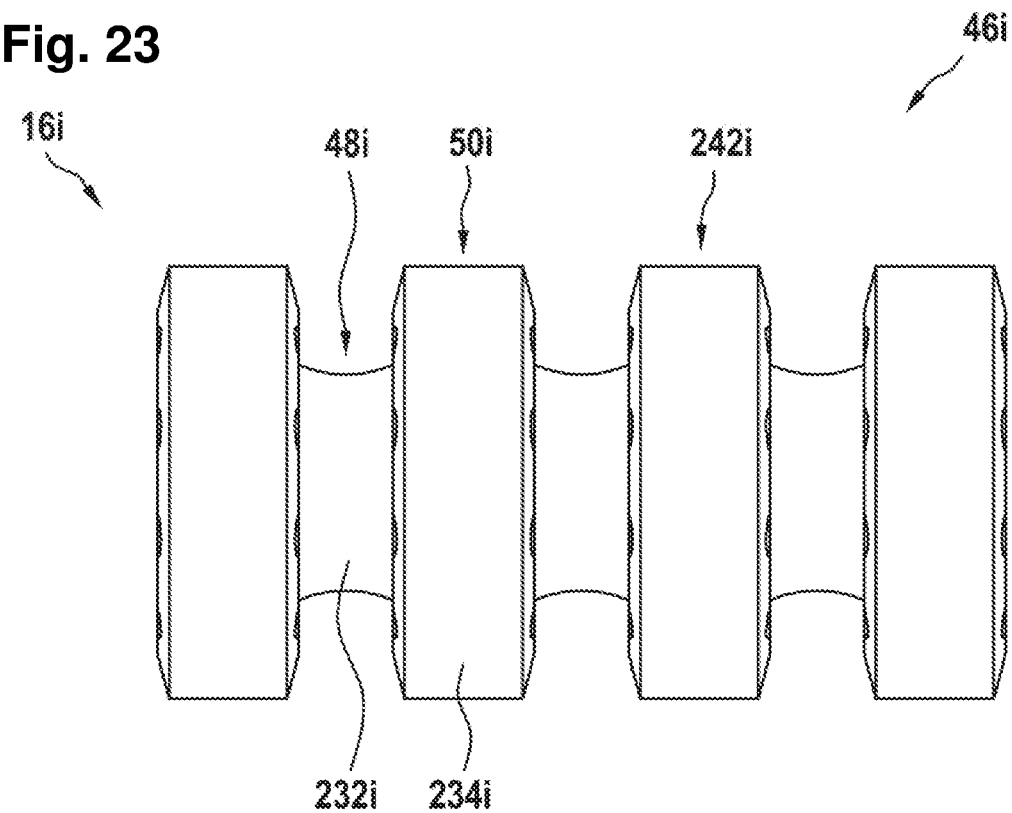
Figure 24:
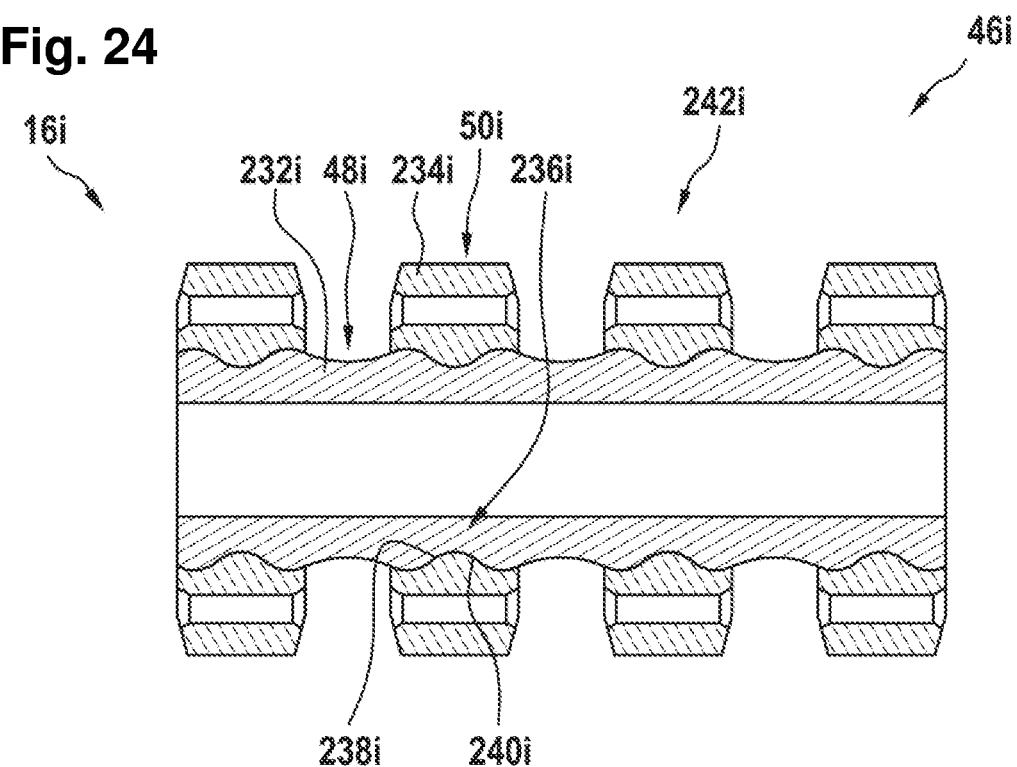
Figure 25:
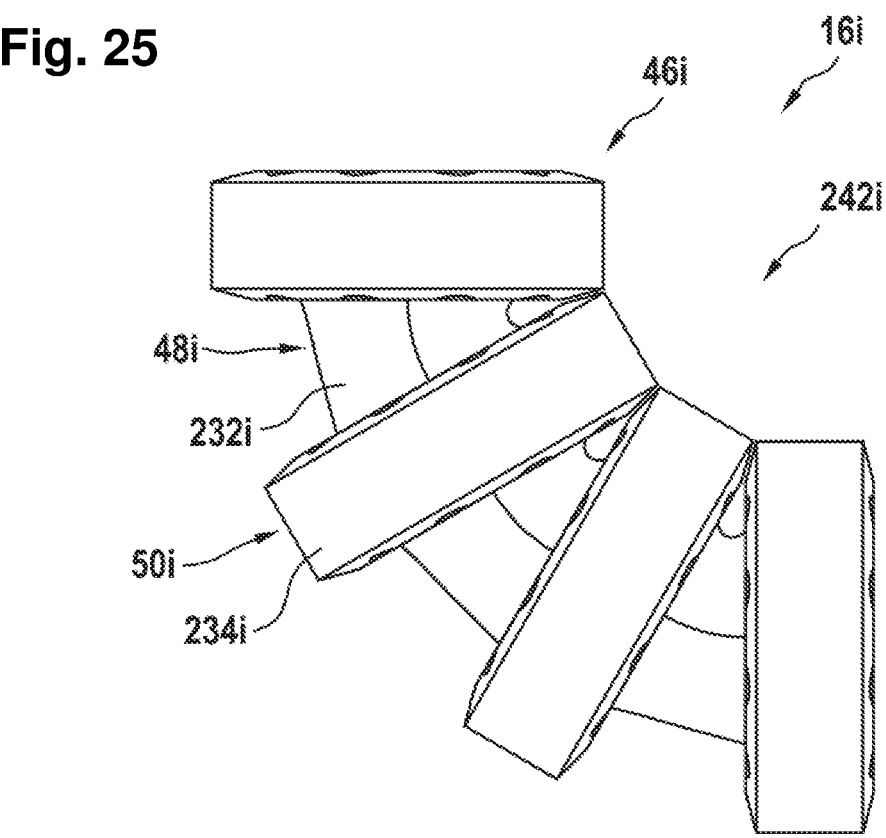
Figure 26:
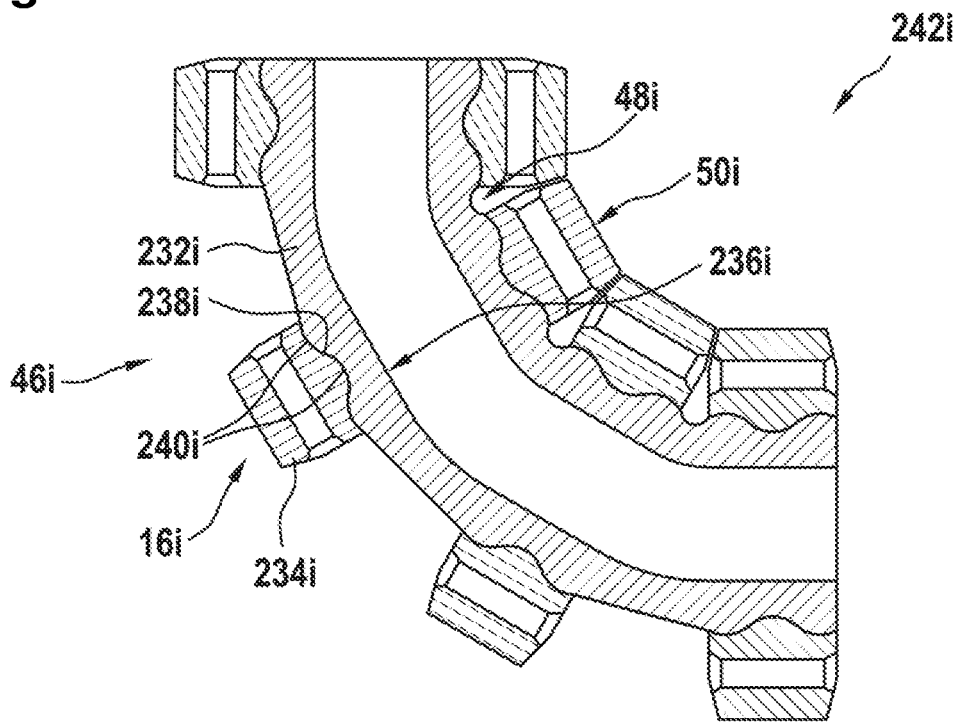
Figure 27:
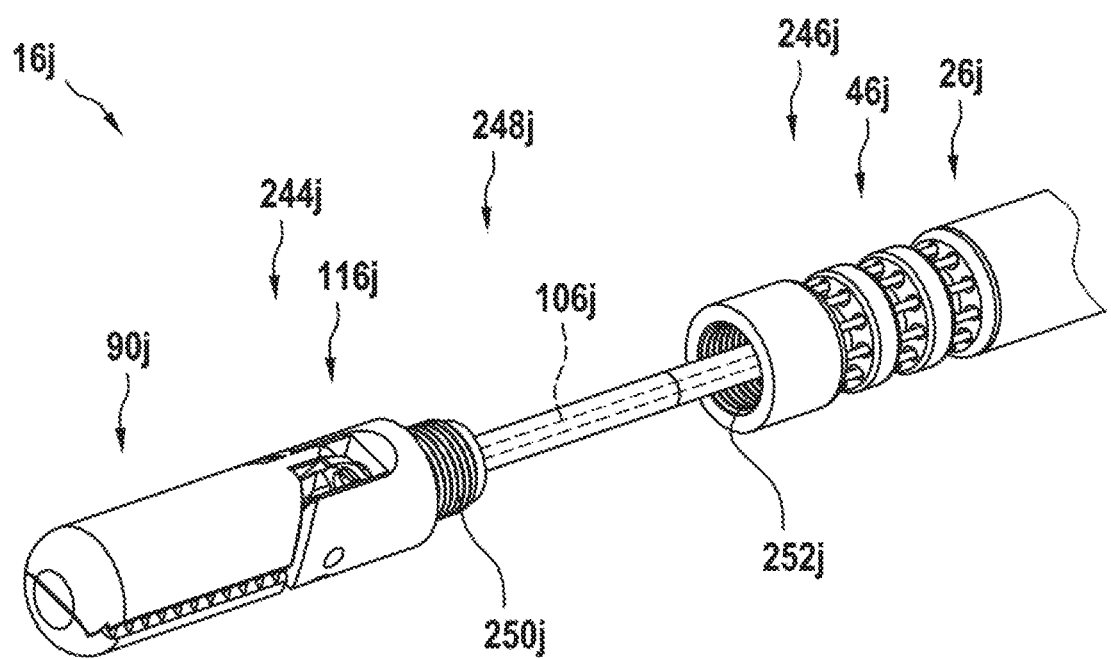

In the figures:

FIG. 1. is a schematic perspective elevation of a surgical system with an endoscopic device;

FIG. 2. is a schematic side view of a part of the endoscopic device disposed in a linear configuration;

FIG. 3. is a schematic side view of a part of the endoscopic device disposed in a deflection configuration;

FIG. 4. is a schematic sectional illustration of a part of the endoscopic device disposed in a linear configuration;

FIG. 5. is a schematic sectional illustration of a part of the endoscopic device disposed in a deflection configuration;

FIG. 6. is a schematic perspective elevation of a part of the endoscopic device in a partially disassembled state;

FIG. 7. is a schematic sectional illustration of at least a part of a further endoscopic device along a shaft of the endoscopic device;

FIG. 8. is a schematic sectional illustration of at least a part of the endoscopic device from FIG. 7 transverse to a shaft of the endoscopic device;

FIG. 9. is a schematic perspective elevation of a part of the endoscopic device from FIG. 7;

FIG. 10. is a schematic sectional illustration of at least a part of an alternative endoscopic device along a shaft of the endoscopic device in a linear configuration;

FIG. 11. is a schematic sectional illustration of at least a part of the endoscopic device from FIG. 10 along the shaft of the endoscopic device in a deflection configuration;

FIG. 12. is a schematic perspective elevation of at least a part of a further endoscopic device;

FIG. 13. is a schematic perspective elevation of at least a part of an additional endoscopic device in an assembly state;

FIG. 14. is a schematic perspective elevation of at least a part of the endoscopic device from FIG. 13 in a further assembly state;

FIG. 15. is a schematic perspective elevation of at least a part of the endoscopic device from FIG. 13 and FIG. 14 in an additional assembly state;

FIG. 16. is a schematic plan view of at least a part of a further endoscopic device;

FIG. 17. is a schematic perspective elevation of at least a part of an alternative endoscopic device;

FIG. 18. is a schematic perspective elevation of at least a part of an alternative endoscopic device in an assembly state;

FIG. 19. is a schematic perspective elevation of at least a part of the endoscopic device from FIG. 18 in an assembled state;

FIG. 20. is a schematic perspective elevation of at least a part of the endoscopic device from FIG. 18 in an assembly state;

FIG. 21. is a schematic perspective elevation of at least a part of the endoscopic device from FIG. 18 in a further assembly state;

FIG. 22. is a schematic perspective elevation of at least a part of the endoscopic device from FIG. 18 in an assembled state;

FIG. 23. is a schematic side view of at least a part of an alternative endoscopic device in a linear configuration;

FIG. 24. is a schematic sectional view of at least a part of the endoscopic device from FIG. 23 along a shaft of the endoscopic device in the linear configuration;

FIG. 25. is a schematic side view of at least a part of the endoscopic device from FIGS. 23 and 24 in a deflection configuration;

FIG. 26. is a schematic sectional view of at least a part of the endoscopic device from FIGS. 23, 34, and 25 along the shaft of the endoscopic device in the deflection configuration;

FIG. 27. a schematic perspective elevation of at least a part of an alternative endoscopic device in an assembly state.

DESCRIPTION OF THE EXEMPLARY EMBODIMENTS

FIG. 1 is a schematic perspective elevation of a surgical system 10a. The surgical system 10a comprises at least one surgical robot 12a. Furthermore, the surgical system 10a comprises at least one control device 14a. The control device 14a is designed to control the surgical robot 12a.

The surgical robot 12a is designed to guide at least one endoscopic device 16a of the surgical system 10a. To this end, the surgical robot 12a has at least one robot arm 18a. In an operating mode, the endoscopic device 16a is coupled to the robot arm 18a. The endoscopic device 16a can be detachably connected to the robot arm 18a, for example in order to exchange the latter, modify it, sterilize it, or the like. In the present case, the surgical robot 12a has a plurality of robot arms. Of the robot arms, for the sake of clarity only the robot arm 18a is provided with a reference symbol.

The surgical system 10a comprises at least one endoscopic device 16a. In the present case, the surgical system 10a comprises a plurality of endoscopic devices. The surgical robot 12a has one robot arm 18a per endoscopic device 16a. Of the endoscopic devices, for the sake of clarity only the endoscopic device 16a is provided with a reference symbol. The plurality of endoscopic devices could be substantially identical to one another. Substantially identical can mean the same apart from manufacturing and/or assembly tolerances. However, it is possible for at least some of the plurality of endoscopic devices to be different from one another and, for example, to differ from one another in a type of end effector and/or functioning. Also, one skilled in the art would readily adapt the plurality of endoscopic devices to different surgical applications based on his expertise.

The endoscopic device 16a embodies at least part of an endoscopic instrument 20a. In the present case, the endoscopic device 16a completely embodies an endoscopic instrument 20a. However, an endoscopic device could be only one component of an endoscopic instrument. Furthermore, an endoscopic device, for example one of the plurality of endoscopic devices, could embody at least part of or the entire endoscope 22a. However, an endoscopic device could be only one component of an endoscope.

FIG. 2 is a schematic side view of a part of the endoscopic device 16a in a linear configuration. Further, FIG. 3 is a schematic side view of a part of the endoscopic device 16a which is in a deflection configuration.

The endoscopic device 16a has at least one shaft 26a. In the present case, the endoscopic device 16a has exactly one shaft 26a. The shaft 26a has a longitudinal direction 38a. The longitudinal direction 38a corresponds to a primary extension direction of the shaft 26a in the linear configuration. A longitudinal extension 40a of the shaft 26a extends along the longitudinal direction 38a of the shaft 26a.

The shaft 26a comprises at least one end segment 28a. The end segment 28a is a distal end segment. The end segment 28a is designed for treating a patient. Furthermore, the shaft 26a has a further end segment 30a. The further end segment 30a is a proximal end segment. The further end segment 30a is designed for coupling to the surgical robot 12a, for example to the robot arm 18a thereof. The end segment 28a and the further end segment 30a oppose one another. Furthermore, the shaft 26a has a center segment 32a. The center segment 32a connects the end segment 28a and the further end segment 30a to one another. The center segment 32a is arranged between the end segment 28a and the further end segment 30a.

The shaft 26a has a basic structure 34a. The basic structure 34a extends from the end segment 28a to the further end segment 30a of the shaft 26a. Furthermore, the shaft 26a has a shaft jacket 36a. The shaft jacket 36a surrounds at least part of the basic structure 34a. In the present case, the shaft jacket 36a surrounds the basic structure 34a, at least to a large extent. The shaft jacket 36a is arranged coaxially with the basic structure 34a. The shaft jacket 36a surrounds at least part of the center segment 32a. In the present case, the shaft jacket 36a surrounds the center segment 32a, at least to a large extent. Furthermore, the shaft 26a can have a shaft sleeve. For the sake of clarity, a shaft sleeve is not shown in the figures, in order to be able to better illustrate the structure of the basic structure 34a. A shaft sleeve can be designed to seal the shaft 26a from the outside.

The shaft 26a has at least one deflectable segment 42a. The deflectable segment 42a is arranged between the end segment 28a and the further end segment 30a. The deflectable segment 42a is part of the with center segment 32a. The deflectable segment 42a is connected directly to the end segment 28a. The deflectable segment 42a is spaced apart from the further end segment 30a. Alternatively, it is possible for a deflectable segment to embody at least part of an end segment, for example, a distal end segment. The deflectable segment could advantageously be surrounded by a shaft sleeve. At least part of the shaft sleeve can be embodied elastic and/or flexible. For example, the shaft cover can be a rubber tube.

The deflectable segment 42a can be deflected in at least one plane 44a. The plane 44a in FIG. 2 corresponds to an image plane of the figure. The deflectable segment 42a in the present case can even be deflected in a plurality of planes, of which for the sake of clarity only the plane 44a is provided with a reference symbol and is shown in the figures. In the present case, the deflectable segment 42a can even be deflected along an entire circumference of the shaft 26a. At least part of the deflectable segment 42a is embodied flexible.

The basic structure 34a of the shaft 26a has a collar 56a. The collar 56a embodies at least part of the end segment 28a of the shaft 26a. The collar 56a connects to the distal side of the deflectable segment 42a. Furthermore, the basic structure 34a of the shaft 26a has a further collar 58a. The further collar 58a embodies at least part of the center segment 32a of the shaft 26a. The further collar 58a is connected to the proximal side of the deflectable segment 42a.

The endoscopic device 16a has at least one deflection mechanism 46a. The deflection mechanism 46a is designed to deflect the deflectable segment 42a of the shaft 26a. In the region of the deflectable segment 42a, the deflection mechanism 46a embodies at least part of the basic structure 34a of the shaft 26a.

The deflection mechanism 46a has at least one first connecting link 48a. In the present case, the deflection mechanism 46a has a plurality of first connecting links, for example three first connecting links. Of the plurality of first connecting links, for the sake of clarity only the first connecting link 48a is provided with a reference symbol. The plurality of first connecting links is embodied substantially identical. The plurality of first connecting links can be described in the same way as the first connecting link 48a. Alternatively, however, the plurality of first connecting links could also be embodied different from one another, at least in part.

The first connecting link 48a is symmetrical. The first connecting link 48a is essentially designed as a rotating body. The first connecting link 48a has a first rotational symmetry axis 52a. The first connecting link 48a has at least a dual rotational symmetry axis about the first rotational symmetry axis 52a. For example, a number of a first rotational symmetry could correspond to a number of planes in which the deflectable segment can be deflected. In a linear configuration, the longitudinal direction 38a of the shaft 26a corresponds to the first rotational symmetry axis. Furthermore, the deflection mechanism 46a has at least one second connecting link 50a. In the present case, the deflection mechanism 46a has a plurality of second connecting links, for example four second connecting links. Of the plurality of second connecting links, for the sake of clarity only the second connecting link 50a is provided with a reference symbol. Unless stated otherwise, the plurality of second connecting links is embodied substantially identical. The plurality of second connecting links can thus be described in the same way as the second connecting link 50a. Alternatively, the plurality of second connecting links could also be embodied different from one another, at least in part.

At least part of the second connecting link 50a is arranged coaxially surrounding the first connecting link 48a. The second connecting link 50a has an outer diameter that is greater than an outer diameter of the first connecting link 48a. The second connecting link 50a has a disc-like and/or lenticular shape. The first connecting link 48a has an olive-like shape.

The second connecting link 50a is symmetrical. The second connecting link 50a is substantially embodied as a rotational body. The second connecting link 50a has a second rotational symmetry axis 54a. The second connecting link 50a has at least a dual rotational symmetry about the second rotational symmetry axis 54a. For example, a number of a first rotational symmetry could equal a number of planes in which the deflectable segment can be deflected. Furthermore, a rotational symmetry of the second connecting link 50a can equal that of the first. In a linear configuration, the longitudinal direction 38a of the shaft 26a coincides with the second rotational symmetry axis 54a. Furthermore, in the linear configuration, the second rotational symmetry axis 54a coincides with the first rotational symmetry axis 52a.

A difference between a number of the plurality of first connecting links and a number of the plurality of second connecting links is not zero. In the present case, the difference equals the value one, so that the plurality of second connecting links always comprises one second connecting link 50a more than the plurality of first connecting links comprises first connecting links. The number of the plurality of first connecting links is odd. The number of the plurality of second connecting links is even. In the present case, the plurality of first connecting links comprises a total of three first connecting links. In addition, in the present case, the plurality of second connecting links comprises a total of four second connecting links.

Two of the plurality of second connecting links terminate the deflectable segment 42a of the shaft 26a. One of the plurality of second connecting links, advantageously a distal second connecting link, is connected to the collar 56a. In the present case, the distal-side second connecting link 50a is connected in one piece to the collar 56a. This second connecting link 50a connects the deflection mechanism 46a at least partly in one piece to the end segment 28a of the shaft 26a.

Another of the plurality of second connecting links, advantageously a proximal-side second connecting link, is connected to the further collar 56a. In the present case, the proximal-side second connecting link 50a is connected in one piece to the further collar 58*a*. This second connecting link 50*a* connects the deflection mechanism 46*a* at least partly in one piece to the center segment 32*a* of the shaft 26*a*.

The first connecting link 48*a* and the second connecting link 50*a* are designed to cooperate with one another to deflect the shaft 26*a*. The first connecting link 48*a* and the second connecting link 50*a* are arranged in series.

The plurality of first connecting links and the plurality of second connecting links are arranged in series. The plurality of first connecting links and the plurality of second connecting links are arranged alternating. The plurality of first connecting links and the plurality of second connecting links are arranged such that a first connecting link of the plurality of first connecting links is followed by a second connecting link of the plurality of second connecting links. Furthermore, a second connecting link of the plurality of second connecting links is followed by a first connecting link of the plurality of first connecting links.

A first connecting link of the plurality of first connecting links is adjacent to at least one second connecting link of the plurality of second connecting links. Furthermore, a first connecting link of the plurality of first connecting links is arranged adjacent to two opposing second connecting links of the plurality of second connecting links. Each of the plurality of first connecting links is adjacent to two second connecting links of the plurality of second connecting links.

A second connecting link of the plurality of second connecting links is adjacent to at least one first connecting link of the plurality of second connecting links. Furthermore, a second connecting link of the plurality of second connecting links is arranged adjacent to two mutually opposing first connecting links of the plurality of second connecting links. Apart from second connecting links terminating the deflection mechanism, each of the plurality of second connecting links is adjacent to two first connecting links of the plurality of first connecting links.

FIG. 4 is a schematic sectional illustration of a part of the endoscopic device 16*a* in a linear configuration. Furthermore, FIG. 3 is a schematic sectional illustration of a part of the endoscopic device 16*a* in a deflection configuration.

The first connecting link 48*a* and the second connecting link 50*a* cooperate in the manner of a ball joint and/or vertebral bodies. The first connecting link 48*a* has at least one ball head 60*a*. The second connecting link 50*a* has at least one ball socket 62*a*. The ball socket 62*a* is embodied corresponding to the ball head 60*a*. In this way, the ball head 60*a* of the first connecting link 48*a* and the ball socket 62*a* of the second connecting link 50*a* engage in one another, so that the first connecting link 40*a* and the second connecting link 50*a* are borne movable with respect to one another. A reverse configuration, in which a first connecting link has a ball socket and the second connecting link has a ball head 60*a*, is also possible.

In the present case, the first connecting link 40*a* has two opposing ball heads 60*a*. Of the ball heads, for the sake of clarity only the ball head 60*a* is provided with a reference symbol. The ball heads are embodied substantially identical to one another. In the present case, the second connecting link 50*a* has two opposing ball sockets 62*a*. Of the ball sockets, for the sake of clarity only the ball socket 62*a* is provided with a reference symbol. The ball sockets 62*a* are embodied substantially identical to one another. Only the second connecting links of the plurality of second connecting links that terminate the deflection mechanism 46*a* each have only a single ball socket 62*a*.

A first connecting link 48*a* of the plurality of first connecting links is always enclosed by two opposing sides of two second connecting links of the plurality of second connecting links. In other words, opposing ball heads of a single first connecting link 48*a* of the plurality of first connecting links are each enclosed by a ball socket 62*a* of two second connecting links of the plurality of second connecting links. In this way, two ball sockets of two separate second connecting links of the plurality of second connecting links are positioned against two ball heads of a single first connecting link 48*a* of the plurality of first connecting links.

Furthermore, two first connecting links from two opposing sides always engage with one second connecting link 50*a* of the plurality of second connecting links. In other words, ball heads of two first connecting links of the plurality of first connecting links each engage in one of the opposing ball sockets 62*a* of a second connecting link 50*a* of the plurality of second connecting links. In this way, two ball heads of two separate first connecting links of the plurality of first connecting links are positioned against two ball sockets of a single second connecting link 50*a* of the plurality of second connecting links.

Only the second connecting links of the plurality of second connecting links that terminate the deflection mechanism 46*a* enclose only a single first connecting link 48*a* of the plurality of first connecting links. In other words, only one ball head 60*a* of a single first connecting link 48*a* of the plurality of first connecting links engages in each single ball socket 62*a* of the second connecting link 50*a* of the plurality of second connecting links that terminates the deflection mechanism. In this way, only a single ball head of a first connecting link 48*a* of the plurality of first connecting links is positioned in a single ball head 60*a* of a single second connecting link 50*a* of the plurality of second connecting links which terminates this deflection mechanism 46*a*.

In the linear configuration, which is illustrated in FIGS. 2 and 4, for example, a first rotational symmetry axis 52*a* of the first connecting link 48*a* and a second rotational symmetry axis 54*a* of the second connecting link 50*a* coincide with one another. In the deflection configuration, which is shown, for example, in FIGS. 3 and 5, the primary extension direction of the first connecting link 48*a* and the primary extension direction of the second connecting link 50*a* are arranged at an angle to one another. In the deflection configuration, an angle between the first rotational symmetry axis 52*a* of the first connecting link 48*a* and the second rotational symmetry axis 54*a* of the second connecting link 50*a* is at most 15°. A maximum angle is limited by the fact that two of the plurality of second connecting links which enclose a first connecting link of the plurality of first connecting links abut one another.

The first connecting link 40*a* has a first geometric center point 64*a*. Furthermore, the second connecting link 50*a* has a second geometric center point 66*a*. In the linear configuration, the first geometric center point 64*a* and the second geometric center point 66*a* are arranged offset to one another along the longitudinal direction 38*a* of the shaft 26*a*. In the linear configuration, there is a linear configuration distance 68*a* between the first connecting link and the second connecting link. The linear configuration distance 68*a* is defined by a shortest connection between the first geometric center point 64*a* of the first connecting link 48*a* and the second geometric center point 66*a* of the second connecting link 50*a*.

In the deflection configuration, the first geometric center point 64*a* and the second geometric center point 66*a* are arranged offset to one another. In the deflection configuration, there is a deflection distance 70a between the first connecting link 48a and the second connecting link 50a. In the deflection configuration, the deflection distance 70a is defined by a shortest connection between the first geometric center point 64a of the first connecting link 48a and the second geometric center point 66a of the second connecting link 50a. In the present exemplary embodiment, the deflection configuration distance 70a in the deflection configuration is equal to the linear configuration distance 68a in the linear configuration. Alternatively, the deflection distance, could also be greater or less than the linear configuration distance 68a, for example depending on an embodiment of the connecting links.

The first connecting link 40a has at least one outer contour 72a. The outer contour 72a partially forms the ball head 60a of the first connecting link 48a. The outer contour 72a faces outwards. The outer contour 72a points in the direction of an environment of the shaft 26a. The outer contour 72a is not embodied concave. In the present case, the outer contour 72a is embodied convex. The outer contour 72a corresponds to an arc 76a. Alternatively, at least in segments, the outer contour could have a shape that differs from the shape of a circular arc, specifically for example it could be embodied in the shape of a circular involute, a cycloid, a paraboloid and/or an ellipsoid.

There is a diameter 74a of a smallest circular arc 76a that still completely encloses the outer contour 72a of the first connecting link 48a. In the present exemplary embodiment, this diameter 74a is essentially equal to a maximum width of the first connecting link. The width is measured perpendicular to the first rotational symmetry axis 52a and/or longitudinal direction 38a of the shaft 26a. However, it is also possible for a diameter to differ from a width, for example, to be greater than the width.

The second connecting link 50a has at least one inner contour 78a. The inner contour 78a embodies, at least in part, the ball socket 62a of the second connecting link 50a. The inner contour 78a of the second connecting link 48a is designed to cooperate with the outer contour 72a of the first connecting link. The outer contour 72a of the first connecting link 48a and the inner contour 78a of the second connecting link 50a are disposed opposing one another. The outer contour 72a and the inner contour 78a are positioned against one another at most in segments. The inner contour 78a of the second connecting link 50a is designed corresponding to the outer contour 72a of the first connecting link 48a. The inner contour 78a faces inwards. The inner contour 78a is not embodied concave. Furthermore, in the present case the inner contour 78a is linear. Alternatively, an inner contour could be formed at least in segments in an in particular convex shape of a circular involute, circular arc, cycloid, paraboloid, and/or ellipsoid.

The deflection mechanism 46a has at least one control element 80a. In the present case, the deflection mechanism 46a has a plurality of control elements 80a, for example at least three control elements. Of the plurality of control elements, for the sake of clarity only the control element 80a is provided with a reference symbol. The plurality of control elements is arranged offset to one another along a circumference of the shaft 26a. The plurality of control elements run substantially parallel to one another. Furthermore, the plurality of control elements is arranged coaxially surrounding at least the first connecting link or even the plurality of first connecting links. The plurality of control elements is embodied substantially identical, so that a description of the control element 80a applies to the plurality of control elements. Alternatively, the plurality of control elements could also be different from one another, at least in part.

The control element 80a is designed to adjust a deflection of the deflectable segment 42a of the shaft 26a. The control element 80a can be actuated by means of an actuating element. For the sake of clarity, the actuating element is not shown here. The actuating element can be part of the endoscopic device 16a or can even be part of the surgical robot 12a, specifically, for example, part of the robot arm 18a. The control element 80a extends through at least part of the shaft 26a. In the present case, the control element 80a extends through the entire shaft 26a. Furthermore, the control element 80a even extends partially beyond the shaft 26a, for example, to be coupled to an actuating element.

The control element 80a is coupled to the connecting links 48a, 50a. The connecting links 48, 50a are lined up on the control element 80a. The control element 80a keeps the connecting links 48a, 50a under prestress, at least in the linear configuration. Alternatively or additionally, a control element could be designed to rotate a shaft.

The control element 80a is embodied slack. In the present case, the control element 80a is embodied as a wire. The control element 80a is embodied from a stranded wire, for example a metal stranded wire. The control element 80a has a diameter 74a. The diameter can be at least 2.5% and/or at most 25% of an outer diameter of the shaft 26a. In the present case, the diameter 74a is 0.36 mm, for example.

The control element 80a is guided substantially parallel to the shaft 26a. The control element 80a runs at least segment-wise parallel to a longitudinal direction 38a of the shaft 26a. Furthermore, the control element 80a is guided doubled. The control element 80a is divided into a segment which is guided in the direction of the end segment 28a and away from the further end segment 30a and a segment which is guided away from the end segment 28a and in the direction of the further end segment 30a.

For guiding the control element 80a, the second connecting link 50a has at least one through-guide 82a. The through-guide 82a has at least funnel-shaped or two funnel-shaped openings. In the present case, the second connecting link has a plurality of through-guides, of which, for the sake of clarity, only the through-guide is provided with a reference symbol. The plurality of through-guides is arranged offset to one another along a circumference of the second connecting link 50a. The plurality of through-guides is embodied substantially identical, so that a description of through-guide 82a applies to the plurality of through-guides. Alternatively, the plurality of through-guides could also be embodied different from one another, at least in part.

Two through-guides of the second connecting link 50a each guide a control element 80a. A through-guide 82a of the second connecting link 50a guides a segment of the control element 80a guided away from the further end segment 30a and a further through-guide 82a of the second connecting link 50a guides a segment of the control element 80a guided away from the end segment 28a.

FIG. 6 is a schematic perspective elevation of a part of the endoscopic device 16a in a partially disassembled state. The control element 80a is connected to the end segment 28a of the shaft 26a. A part of the control element 80a is arranged in the region of the end segment 28a of the shaft 26a, forming a loop 84a.

The end segment 28a of the shaft 26a has at least one element receptacle 86a. The element receptacle 86a is arranged on the collar 56a. The control element 80a is at least partially arranged in the element receptacle 86a. The part of the control element 80a embodying the loop 84a is arranged in the element receptacle 86*a*. Before the loop 84*a*, the element receptacle 86*a* guides the control element 80*a* in the direction of the end segment 28*a* of the shaft 26*a*. After the loop 84*a*, the element receptacle 86*a* again guides the control element 80*a* back towards the end segment 28*a* of the shaft 26*a*. For at least one axial threading of the control element 80*a*, the element receptacle 86*a* has at least one through-guide 88*a*.

In the present case, the element receptacle 86*a* has a plurality of through-guides. Of the through-guides, for the sake of clarity only the through-guide 88*a* is provided with a reference symbol. The through-guides are arranged on the collar 56*a*. The through-guides are arranged offset to one another in the circumferential direction of the shaft 26*a*. Two through-guides of the end segment 28*a* each guide a control element 80*a*. Alternatively, two individual control elements could also be used instead of a deflected control element. A through-guide 82*a* of the second connecting link 50*a* guides a segment of the control element 80*a* guided away from the further end segment 30*a* and a further through-guide 88*a* of the second connecting link 50*a* guides a segment of the control element 80*a* guided away from the end segment 28*a*.

The endoscopic device 16*a* has at least one end effector 90*a*. The end effector 90*a* is shown in a closed operating mode in FIGS. 2 and 4. The end effector 90*a* is shown in an open operating mode in FIGS. 3 and 5. In the present case, the endoscopic device 16*a* has exactly one end effector 90*a*. The end effector 90*a* is arranged on an end segment 28*a* of the shaft 26*a*. At least part of the end effector 90*a* is connected in one piece to the end segment 28*a* of the shaft 26*a*. In the present case, the end effector 90*a* is designed as a nipper. The end effector 90*a* can also be designed as shears, a clamp, pincers, scalpel, coagulator, stapler, test hook, or the like. An end effector could be designed to be electrically conductive in order, advantageously, to transmit current. An end effector could thus be unipolar, bipolar or the like, for example.

The end effector 90*a* comprises at least one tool piece 92*a*. In the present case, the end effector 90*a* has at least one further tool piece 94*a*. The further tool piece 94*a* is designed to cooperate with the tool piece 92*a*. The further tool piece 94*a* is embodied substantially identical to the tool piece 92*a*. In the present case, the end effector 90*a* comprises a total of two tool pieces 92*a*, 94*a*. A tool piece could be a shears blade, a cutting edge, an electrode, or another tool piece, in particular another surgical tool piece. In the present case, the tool piece 92*a*, 94*a* forms a jaw-like part. The jaw-like part is a branch-type element. The branch-type element can be adapted to a specific application.

The end effector 90*a* has an end effector head 96*a*. The end effector head 96*a* is connected in one piece to an end segment 28*a* of the shaft 26*a*. The end effector head 96*a* is formed in one piece with the collar 56*a*. Furthermore, the end effector head 96*a* is connected in one piece to the second connecting link which terminates the deflection mechanism 46*a* distally.

The end effector head 96*a* has an end effector fork 98*a*. The end effector fork 98*a* comprises at least one end effector leg 100*a*. Furthermore, the end effector fork 98*a* comprises a further end effector leg 102*a*. The end effector leg 100*a* and the further end effector leg 102*a* are arranged opposing one another. The end effector leg 100*a* and the further end effector leg 102*a* are connected to one another. The end effector leg 100*a* and the further end effector leg 102*a* of the end effector head 96*a* are connected to one another in one piece.

The end effector head 96*a* defines an end effector socket 104*a* of the end effector 90*a*. Further components of the endoscopic device 16*a*, for example a movement converter 116*a*, can be arranged in the end effector socket 104*a*.

The endoscopic device 16*a* has at least one actuating unit 106*a*. In the present case, the endoscopic device 16*a* has exactly one actuating unit 106*a*. The actuating unit 106*a* is designed to actuate the end effector 90*a*. The actuating unit 106*a* can be actuated by means of an actuating element. The actuating element can be part of the endoscopic device 16*a* or even part of the surgical robot 12*a*, specifically the robot arm 18*a*, for example.

The actuating unit 106*a* extends at least through part of the shaft 26*a*. The actuating unit 106*a* runs centrally through the shaft 26*a*. In the present case, the actuating unit 106*a* extends through the entire shaft 26*a*. Furthermore, the actuating unit 106*a* even extends in part beyond the shaft 26*a*, for example in order to be coupled to an actuating element.

The actuating unit 106*a* is embodied flexible, at least in segments. The actuating unit 106*a* has at least one flexible segment 108*a*. The actuating unit 106*a* is embodied inflexible, at least in segments. Furthermore, the actuating unit 106*a* has at least one in the inflexible segment 110*a*. The inflexible segment 110*a* is less flexible compared to the flexible segment 108. The flexible segment 108*a* is arranged following the inflexible segment 110*a*.

The actuating unit 106*a* is arranged in the shaft 26*a* such that the flexible segment 108*a* of the actuating unit 106*a* is congruent with the deflectable segment 42*a* of the shaft 26*a*. The actuating unit 106*a* is thus designed to be flexible in the region of the deflectable segment 42*a* of the shaft 26*a*.

The actuating unit 106*a* has at least one inner cable 112*a*. The inner cable 112*a* is designed as a stranded wire. Alternatively, the inner cable could also have a solid wire. The inner cable 112*a* is designed at least for transmitting force mechanically. The inner cable 112*a* is embodied flexible, at least in segments, for example in the flexible segment of the actuating unit 106*a*. In the present case, the inner cable 112*a* is designed to be flexible across the entire extension of the actuating unit 106*a*.

The actuating unit 106*a* has at least one reinforcement 114*a*. The reinforcement 114*a* stiffens the actuating unit 106*a*, at least in part. The reinforcement 114*a* stiffens the actuating unit 106*a* at least in a region of the shaft 26*a* that is different from the flexible segment 108*a*. The reinforcement 114 stiffens the inner cable 112*a* segment-wise. The inner cable 112*a* is arranged coaxially surrounding the reinforcement 114*a*. The reinforcement 114*a* is embodied as a tube. The reinforcement 114*a* is embodied, at least in part, from a metal. Alternatively or additionally, the reinforcement 114*a* can be embodied, at least in part, from a plastic. The reinforcement 114*a* is arranged in the inflexible segment 110*a* of the actuating unit 106*a*. The flexible segment 108*a* of the actuation unit 106*a*, however, does not have a reinforcement 114*a*.

The endoscopic device 16*a* has at least one movement converter 116*a*. In the present case, the endoscopic device 16*a* has exactly one movement converter 116*a*. The movement converter 116*a* is designed to couple the end effector 90*a* and the actuating unit 106*a* to one another, at least mechanically. Alternatively, it would be possible for the movement converter also to connect the end effector and the actuating element to one another electrically.

The movement converter 116*a* is designed to convert a movement of the actuating unit 106*a* to a movement of at least one tool piece 92*a*. The movement of the actuating unit 106a is a linear movement. The movement of the tool piece 92a is a pivoting movement. It would be possible for the further tool piece 94a to be arranged in a fixed manner or, in other words, not to be movable. In the present case, however, the further tool piece 94a is also coupled to the actuating unit 106a via the movement converter 116a. The movement converter 116a is designed to convert a movement of the actuating unit 106a to a movement of the further tool piece 94a. The movement of the further tool piece 94a is a pivoting movement.

Regardless of an operating mode, the movement converter 116a is arranged in a non-emerging manner within at least part of the end effector 90a. In the present case, the movement converter 116a is arranged at least to a large extent in the end effector head 96a, regardless of operating mode. The movement converter 106a is arranged at least to a large extent in the end effector socket 104a of the end effector head 96a, regardless of operating mode. In a side view, the end effector head 96a covers the movement converter 116, at least to a large extent, regardless of operating mode. The movement converter 116a is covered on the side by the end effector fork 98a in that the latter is arranged congruent with the end effector legs 100a, 102a of the end effector fork 98a. In the present case, in a side view, at least one end effector leg 100a, 102a of the end effector fork 98a of the end effector head 96a covers the movement converter, at least to a large extent.

The movement converter 116a defines at least one pivot axis 118a. The pivot axis 118a is designed for swiveling the tool piece 92a. The pivot axis 118a is oriented at least substantially perpendicular to a primary extension axis 120a of the end effector 90a. The pivot axis 118a is arranged laterally offset from a primary extension axis 120a of the end effector 90a. In other words, the primary extension axis 120a of the end effector 90a and the pivot axis 118a do not intersect. There is also an imaginary plane which is parallel to the primary extension axis 120a of the end effector 90a and to which the pivot axis 118a is oriented substantially perpendicular.

The movement converter 116a has a mechanical force path. The movement converter 116a transmits a force from the actuating unit 106a at least to the tool piece 92a of the end effector 90a via the mechanical force path. In the present case, the movement converter 106a has at least one further mechanical force path. The movement converter transmits a force from the actuating unit 106a to the further tool piece 94a of the end effector 90a via the further mechanical force path.

The movement converter 116a comprises at least one thrust and/or traction piston 122a. In the present case, the movement converter 116a comprises exactly one thrust and/or traction piston 122a. The thrust and/or traction piston 122a is arranged in the end effector socket 104a, at least to a large extent, regardless of operating mode. In a side view, the thrust and/or traction piston 122a is covered by the end effector fork 98a, for example by the end effector leg 100a and/or the further end effector leg 102a of the end effector fork 98a. The thrust and/or traction piston 122a is connected to the actuating unit 106a at least for transmitting force. Furthermore, the thrust and/or traction piston 122a could be electrically connected to the actuating unit 106a.

The thrust and/or traction piston 122a is guided linearly. The end effector head 96a has a piston guide 126a. The piston guide 126a is embodied corresponding at least to a part of the thrust and/or traction piston 122a. The piston guide 126a is designed to linearly guide the thrust and/or traction piston 122a. The thrust and/or traction piston 122a has a pin 124a. The pin 124a has a cylindrical shape. The pin 124a is arranged in a piston guide 126a of the end effector head 96a.

The actuating unit 106a and the thrust and/or traction piston 122a are connected to one another at least in a positive and/or non-positive fit. In the present case, the thrust and/or traction piston 122a are even connected to one another in a friction fit. The actuating unit 106a and the thrust and/or traction piston 122a are connected to one another by plastic deformation of the thrust and/or traction piston 122a and/or of the actuating unit 106a. The thrust and/or traction piston 122a and/or the actuating unit 106a are crimped to one another. In the present case, the pin 124a of the thrust and/or traction piston 122a is designed for connecting to the actuating unit 106a.

The pin 124a of the thrust and/or traction piston 122a defines an actuating unit receptacle 128a. The actuating unit 106a is partially inserted into the actuating element receptacle 128a. The pin 124a is pressed with the actuating unit 106a. In this way, the actuating unit 106a is pressed in the pin 124a. Alternative or additionally, the actuating unit and the thrust and/or traction piston could be connected to one another at least in a bonded fit. For example, the actuating unit and the thrust and/or traction piston could be soldered and/or glued to one another. For example, the pin 124a has filling holes into which an adhesive or solder can be introduced to create a bonded connection in the actuating unit receptacle.

The thrust and/or traction piston 122a has an anchor 130a. The anchor 130a is essentially plate-shaped. The anchor 130a has the shape of a substantially circular outline. The end effector fork 98a forms a stop for the anchor 130a. The anchor 130a is larger than the piston guide receptacle in at least one dimension. In this way, the anchor 130a limits a linear movement of the thrust and/or traction piston 122a or of the actuating unit 106a. The anchor 130a is arranged in the end effector socket 104a. In a side view, the anchor 130a is covered by the end effector fork 98a, for example by the end effector leg 98a and/or the further end effector leg 102a of the end effector fork 98a. The anchor 130a is connected to the pin 124a.

At least part of the thrust and/or traction piston 122a is made in one piece. In the present case, the anchor 130a and the pin 124a of the thrust and/or traction piston 122a are connected to one another in one piece. Alternatively, the thrust and/or traction piston could also be made in several parts. In the present case, the anchor 130a and the pin 124a are connected to one another in one piece. At least part of the thrust and/or traction piston 122a is embodied from metal. For example, the thrust and/or traction piston 122a can also be an injection molded component.

The movement converter 116a has at least one pivot lever 132a. The pivot lever 132a is connected at least mechanically to the thrust and/or traction pistons 122a. The pivot lever 132a is connected to the end effector 90a. The pivot lever 132a is connected to the tool piece 92a. In the present case, the pivot lever 132a is connected in one piece to the tool piece 92a. At least part of the pivot lever 132a is arranged in the end effector socket 104a. In the present case, at least part of the pivot lever 132a is arranged in the end effector socket 104a. In a side view, the pivot lever 132a is covered by the end effector fork 98a, for example by the end effector leg 100a and/or the further end effector leg 102a of the end effector fork 98a. The pivot lever 132a is positioned against the thrust and/or traction piston 122a, specifically, for example, against the anchor 130a of the thrust and/or traction piston 122a.

The pivot lever 132a has a pivot lever base body 134a. The pivot lever base body 134a is substantially plate-shaped. In a side view, the pivot lever base body 134a has a circular outline. The pivot lever base body 134a is embodied in one piece with the tool piece 92a.

The movement converter 116a has a coupling mechanism 136a. The coupling mechanism 136a is designed at least for mechanically coupling the pivot lever 132a and the thrust and/or traction piston 122a. At least part of the coupling mechanism 136a is embodied by the pivot lever 132a. Furthermore, at least part of the coupling mechanism 136a is formed by the thrust and/or traction piston 122a. The coupling mechanism 136a has at least one coupling element 138a. The coupling mechanism 136a has at least one corresponding coupling element 140a. The corresponding coupling element 140a is embodied corresponding to the coupling element 138a. The coupling element 138a and the corresponding coupling element 140a together define the pivot axis 118a of the movement converter 116a which is oriented at least substantially perpendicular to a primary extension axis 120a of the end effector 90a and is laterally offset thereto.

The coupling element 138a is part of the thrust and/or traction piston 122a. The coupling element 138a is arranged on the anchor 130a of the thrust and/or traction piston 122a. The coupling element 138a is securely connected to the anchor 130a. The coupling element 138a is arranged offset to a geometric center point 64a, 66a of the anchor 130a. The coupling element 138a is arranged offset to the primary extension axis 120a. In the present case, the coupling element 138a is designed as a cam.

The corresponding coupling element 140a is part of the pivot lever 132a. The corresponding coupling element 140a is arranged on or connected to the pivot lever base body 134a. The corresponding coupling element 140a is arranged offset to a geometric center point 64a, 66a of the pivot lever base body 134a. The corresponding coupling element 140a is arranged offset to the primary extension axis 120a of the end effector 120a. In the present case, the corresponding coupling element 140a is embodied as a cam follower, for example in the form of a laterally open recess in the pivot lever 132a. If the thrust and/or traction piston 122a and the pivot lever 132a are coupled to one another by means of the coupling mechanism 136a, the coupling element 138a and the corresponding coupling element 140a engage in one another and make contact with one another. Alternatively, the configurations of the coupling element and the corresponding coupling element could also be switched with one another, for example, the coupling element could thus be embodied as a cam follower and the corresponding complement as a cam.

The movement converter 116a has a pivot bearing 142a. The pivot bearing 142a is designed at least for rotatably bearing the tool piece 92a relative to the end effector head 96a. The pivot bearing 142a is at least partially formed by the pivot lever 132a. Furthermore, the pivot bearing 142a is formed, at least in part, by the end effector head 96a. The pivot bearing 142a has at least one bearing element 144a. The pivot bearing 142a has at least one corresponding bearing element 146a. The corresponding bearing element 146a is embodied corresponding to the bearing element 144a. The bearing element 144a and the corresponding bearing element 146a together define rotational axis 148a about which the tool piece 92a rotates when the tool piece 92a is actuated. The rotational axis 148a is oriented at least substantially perpendicular to a primary extension axis 120a of the end effector 90a and is laterally offset thereto. Furthermore, the rotational axis 148a is arranged substantially parallel to the pivot axis 118a. With respect to a primary extension axis 120a of the end effector 90a, the rotational axis 148a opposes the pivot axis 118a.

The bearing element 144a is part of the pivot lever 132a. The bearing element 144a is arranged on or connected to the pivot lever base body 134a. The bearing element 144a is arranged offset to a geometric center point 64a, 66a of the pivot lever base body 134a. The bearing element 144a is arranged offset to the primary extension axis 120a of the end effector 90a. The bearing element 144a opposes the corresponding coupling element 140a. In the present case, the bearing element 144a is designed as a cam.

The corresponding bearing element 146a is part of the end effector head 96a. The corresponding bearing element 146a is arranged on or connected to the end effector leg 100a of the end effector fork 98a. The corresponding bearing element 146a is arranged offset to a geometric center point 64a, 66a of the end effector leg 100a. The corresponding bearing element 146a is arranged offset to the primary extension axis 120a of the end effector 90a. In the present case, the corresponding bearing element 146a is embodied as a cam follower, for example in the form of a laterally open recess in the end effector leg 100a. If the pivot lever 132a and the end effector head 96a are rotatably borne with one another by means of the pivot bearing 142a, the bearing element 144a and the corresponding coupling element 140a engage with one another and make contact with one another. Alternatively, the embodiments of the bearing element and of the corresponding bearing element could also be switched with one another; for example, the bearing element could thus be embodied as a cam follower and the corresponding bearing element as a cam.

The movement converter 116a has at least one further pivot lever 150a. The further pivot lever 150a is at least mechanically connected to the thrust and/or traction piston 122a. The further pivot lever 150a is connected to the end effector 90a. The further pivot lever 150a is connected to the further tool piece 94a. In the present case, the further pivot lever 150a is connected in one piece to the further tool piece 94a. At least part of the further pivot lever 150a is arranged in the end effector socket 104a. In the present case, at least part of the further pivot lever 150a is arranged in the end effector socket 104a. In a side view, the further pivot lever 150a is covered by the end effector fork 98a, for example by the end effector leg 100a and/or the further end effector leg 102a of the end effector fork 98a. The further pivot lever 150a is positioned against the thrust and/or traction piston 122a, specifically, for example, against the anchor 130a of the thrust and/or traction piston 122a. The further pivot lever 150a is positioned on a side opposing the pivot lever 132a against the thrust and/or traction piston 122a.

The further pivot lever 150a has a further pivot lever base body 152a. The further pivot lever base body 152a is plate-shaped. In a side view, the further pivot lever base body 152a has a circular outline. The further pivot lever base body 152a is embodied in one piece with the further tool piece 94a.

The movement converter 116a has a further coupling mechanism 154a. The further coupling mechanism 154a is designed at least for mechanically coupling the further pivot lever 150a and the thrust and/or traction piston 122a. At least part of the further coupling mechanism 154a is embodied by the further pivot lever 150a. Furthermore, at least part of the further coupling mechanism 154a is formed by the thrust and/or traction piston 122a. The further coupling mechanism 154a has at least one further coupling element

156*a*. The further coupling mechanism 154*a* has at least one further corresponding coupling element 158*a*. The further corresponding coupling element 158*a* is embodied corresponding to the coupling element 156*a*. The further coupling element 156*a* and the further corresponding coupling element 158*a* together define the further pivot axis 160*a* of the movement converter 116*a* which is oriented at least substantially perpendicular to a primary extension axis 120*a* of the end effector 90*a* and is laterally offset thereto. The further pivot axis 160*a* is disposed opposing the pivot axis 118*a* in relation to the primary extension axis 120*a*. The further pivot axis 160*a* is essentially parallel to the pivot axis 108*a*.

The further coupling element 156*a* is part of the thrust and/or traction piston 122*a*. The further coupling element 156*a* is arranged on the anchor 130*a* of the thrust and/or traction piston 122*a*. The further coupling element 156*a* is arranged on the side of the anchor 130*a* which opposes the side on which the coupling element 138*a* is arranged. The further coupling element 156*a* is securely connected to the anchor 130*a*. The further coupling element 156*a* is arranged offset to a geometric center point 64*a*, 66*a* of the anchor 130*a*. The further coupling element 156*a* is arranged offset to the primary extension axis 120*a*. In the present case, the further coupling element 156*a* is designed as a cam.

The further corresponding coupling element 158*a* is part of the further pivot lever 150*a*. The further corresponding coupling element 158*a* is arranged on or connected to the further pivot lever base body 152*a*. The further corresponding coupling element 158*a* is arranged offset to a geometric center point 64*a*, 66*a* of the further pivot lever base body 152*a*. The further corresponding coupling element 158*a* is arranged offset to the primary extension axis 120*a* of the end effector 90*a*. In the present case, the further corresponding coupling element 158*a* is embodied as a cam follower, for example in the form of a laterally open recess in the further pivot lever 150*a*. If the thrust and/or traction piston 122*a* and the further pivot lever 150*a* are coupled to one another by means of the further coupling mechanism 154*a*, the further coupling element 156*a* and the corresponding coupling element 158*a* engage in one another and make contact with one another. Alternatively, the embodiments of the further coupling element and the further corresponding coupling element could also be switched with one another; for example, the further coupling element could thus be embodied as a cam follower and the further corresponding complement as a cam.

The movement converter 116*a* has a further pivot bearing 162*a*. The further pivot bearing 162*a* is designed at least for rotatably bearing the further tool piece 94*a* relative to the end effector head 96*a*. At least part of the further pivot bearing 162*a* is formed by the further pivot lever 150*a*. Furthermore, at least part of the further pivot bearing 162*a* is formed by the end effector head 96*a*. The further pivot bearing 162*a* has at least one further bearing element 164*a*. The further pivot bearing 162*a* has at least one further corresponding bearing element 166*a*. The further corresponding bearing element 166*a* is embodied corresponding to the further bearing element 164*a*. The further bearing element 164*a* and the further corresponding bearing element 166*a* together define a further rotational axis 168*a* about which the further tool piece 94*a* rotates when the further tool piece 94*a* is actuated. The further rotational axis 168*a* is arranged at least substantially perpendicular to a primary extension axis 120*a* of the end effector 90*a* and is laterally offset thereto. Furthermore, the further rotational axis 168*a* is arranged substantially parallel to the further pivot axis 160*a*. With respect to a primary extension axis 120*a* of the end effector 90*a*, the further rotational axis 168*a* opposes the further pivot axis 160*a*.

The further bearing element 164*a* is part of the further pivot lever 150*a*. The further bearing element 164*a* is arranged on or connected to the further pivot lever base body 152*a*. The further bearing element 164*a* is arranged offset to a geometric center point 64*a*, 66*a* of the further pivot lever base body 152*a*. The further bearing element 164*a* is arranged offset to the primary extension axis 120*a* of the end effector 90*a*. The further bearing element 164*a* is disposed opposing the corresponding further coupling element 156*a*. In the present case, the further bearing element 164*a* is designed as a cam.

The further corresponding bearing element 166*a* is part of the end effector head 96*a*. The further corresponding bearing element 166*a* is arranged or connected to the further end effector leg 102*a* of the end effector fork 98*a*. The further corresponding bearing element 166*a* is arranged offset to a geometric center point 64*a*, 66*a* of the further end effector leg 102*a*. The further corresponding bearing element 166*a* is arranged offset to the primary extension axis 120*a* of the end effector 90*a*. In the present case, the further corresponding bearing element 166*a* is designed as a cam driver, for example in the form of a laterally open recess in the further end effector leg 102*a*. If the further pivot lever 150*a* and the end effector head 96*a* are rotatably borne with one another by means of the further pivot bearing 162*a*, the further bearing element 164 and the further corresponding coupling element 158*a* engage in one another and make contact with one another. Alternatively, the embodiments of the further bearing element and of the further corresponding bearing element could also be switched with one another, for example the further bearing element could thus be embodied as a cam follower and the further corresponding bearing element as a cam.

The movement converter 116*a* has a guide bearing 170*a*. The guide bearing 170*a* is designed to guide components of the movement converter 116*a*. The guide bearing 170*a* has a slotted guide 172*a* for guiding the pivot lever 132*a*. The slotted guide 172*a* is embodied in the shape of a curved elongated hole. The slotted guide 172*a* is defined by the pivot lever 132*a*. The slotted guide 172*a* extends through a geometric center point 64*a*, 66*a* of the pivot lever 132*a*. The slotted guide 172*a* is formed by a recess in the pivot lever base body 134*a*.

The guide bearing 170*a* has a further slotted guide 174*a* for guiding the further pivot lever 150*a*. The further slotted guide 174*a* is embodied in the shape of a curved elongated hole. At least the further slotted guide 174*a* is rotated by 180° in comparison to the slotted guide 172*a*. The further slotted guide 174*a* is defined by the further pivot lever 150*a*. The further slotted guide 174*a* extends through a geometric center point 64*a*, 66*a* of the further pivot lever 150*a*. The further slotted guide 174*a* is formed by a recess in the further pivot lever base body 152*a*.

The guide bearing 170*a* has an additional slotted guide 176*a* for guiding the thrust and/or traction piston 122*a*. The additional slotted guide 176*a* is embodied in the form of a linear elongated hole. The additional slotted guide 176*a* is defined by the thrust and/or traction piston 122*a*. The further slotted guide 174*a* extends through a geometric center point 64*a*, 66*a* of the anchor 130*a* of the thrust and/or traction piston 122*a*. The additional slotted guide 176*a* is formed by a recess in the further anchor 130*a*.

The guide bearing 170*a* further comprises a guide pin 178*a*. The guide pin 178*a* is arranged extending through the slotted guide 172*a*. In addition, the guide pin 178*a* is arranged extending through the additional slotted guide 176*a*. Furthermore, the guide pin 178*a* is arranged extending through the further slotted guide 174*a*. The guide pin 178*a* is connected to the end effector head 96*a*, specifically, for example, to the end effector fork 98*a*. The end effector leg 100*a* of the end effector fork 98*a* has a pin receiving element 180*a*. The pin receiving element is embodied for a positive and/or non-positive fit with the guide pin 178*a*. Furthermore, the further end effector leg 102*a* of the end effector fork 98*a* has a further pin receiving element 182*a*. The further pin receiving element 182*a* is embodied for a positive and/or non-positive fit with the guide pin 178*a*. In an assembled state, the guide pin 178*a* extends through the pin receiving element 180*a*, the slotted guide 172*a*, the additional slotted guide 176*a*, the further slotted guide 174*a*, and the further pin receiving elements 182*a*. The guide pin 178*a* secures the pivot lever, the further pivot lever 150*a* and the thrust and/or traction piston 122*a* on the end effector head 96*a*.

FIGS. 7 through 27 illustrate further exemplary embodiments according to the disclosure. The following descriptions and the drawings are substantially limited to the differences between the exemplary embodiments, referring in particular to FIGS. 1 through 6 with respect to components having the same designation, in particular with respect to components having the same reference symbols, in principle also to the drawings and/or the description of the other exemplary embodiments. All combinations of the exemplary embodiments mentioned here are also to be considered as disclosed. To distinguish between the exemplary embodiments, the letter "a" follows the reference numerals of the exemplary embodiment in FIGS. 1 through 6. In the exemplary embodiments in FIGS. 7 through 27, the letter "a" is replaced by the letters "b" through "j", FIG. 7 is a schematic sectional illustration of a further exemplary embodiment of at least one part of an endoscopic device 16*b* according to the principles of the present disclosure along a shaft 26*b* of the endoscopic device 16*b*. The present exemplary embodiment is distinguished from the previous exemplary embodiment essentially in the electrification of the endoscopic device 16*b*.

The endoscopic device 16*b* has an actuating unit 106*b*. The actuating unit 106*b* has at least one electrical pole conductor 184*b*. The electrical pole conductor 184*b* is designed to provide at least one electrical potential for at least one tool piece 92*b* of an end effector 90*b* of the endoscopic device 16*b*. The electrical pole conductor 184*b* is designed as an inner conductor. The electrical pole conductor 184*b* is formed by an inner cable 112*b* of the actuating unit 106*b*. It is possible for the electrical pole conductor to be designed to provide the same electrical potential for the tool piece and the further tool piece.

The actuating unit 106*b* has at least one further electrical pole conductor 186*b*. The further electrical pole conductor 186*b* is designed to provide at least one further electrical potential for a further tool piece 94*b* of the end effector 90*b* of the endoscopic device 16*b*. The electrical pole conductor 184*b* has a primary extension. Furthermore, the further electrical pole conductor 186*b* has a further primary extension. The primary extension of the electrical pole conductor 184*b* is greater than a further primary extension of the further electrical pole conductor 186*b*. The further electrical pole conductor 186*b* is embodied separate from the electrical pole conductor 184*b*. The further electrical pole conductor 186*b* is designed to provide at least one further electrical potential. The further electrical pole conductor 186*b* coaxially surrounds the electrical pole conductor 184*b*. The further electrical pole conductor 186*b* is designed as an outer conductor. The further electrical pole conductor 186*b* is embodied in a tube-like manner. At least part of the further electrical pole conductor 186*b* is embodied by a mesh. The actuating unit 106*b* has an outer cable 188*b*. The outer cable 188*b* is arranged surrounding the inner cable 112*b*. The outer cable 188*b* embodies the further electrical pole conductor 186*b*.

FIG. 8 is a schematic sectional illustration of at least one part of the endoscopic device 16*b* transverse to the shaft 16*b*. The actuating unit 106*b* has at least one electrical insulator 190*b*. At least part of the electrical insulator 190*b* is embodied by an insulating material. The insulating material has a CTI value of at least 150. In the present case, the insulating material even has a CTI value greater than 600. The insulating material can be PEEK, for example. In the present case, the insulating material is a tetrafluoroethylene-hexafluoropropylene copolymer (FEP) or a perfluoroalkoxy polymer (PFA). The plastic can be flexible and/or elastic. The electrical insulator 190*b* coaxially surrounds the electrical pole conductor 184*b*. The electrical insulator 190*b* is arranged between the electrical pole conductor 184*b* and the further electrical pole conductor 186*b*. The actuating unit 106*b* has at least one further electrical insulator 192*b*. The further electrical insulator 192*b* coaxially surrounds the further electrical pole conductor 186*b*.

The endoscopic device 16*b* has a movement converter 116*b* (see FIG. 7). The movement converter 116*b* is designed to mechanically couple the end effector 90*b* and the actuating unit 106*b*. In the present exemplary embodiment, the movement converter 116*b* is additionally designed to electrically couple the end effector 90*b* and the actuating unit 106*b*. The movement converter 116*b* connects at least the electrical pole conductor 184*b* to the tool piece 92*b*. In the present case, the movement converter 116*b* electrically connects the electrical pole conductor 184*b* to the tool piece 92*b*. Furthermore, the movement converter 116*b* electrically connects the further electrical pole conductor 186*b* to the further tool piece 94*b*.

In the present case, a mechanical force path of the movement converter 116*b*, via which power is transmitted from the actuating unit 106*b* to the tool piece 92*b*, and an electrical route of the movement converter 116*b*, via which electrical potential is transmitted to the tool piece 92*b*, are identical. Furthermore, in the present case, a mechanical force path of the movement converter 116*b*, via which a force is transmitted from the actuating unit 106*b* to the further tool piece 94*b*, and an electrical path of the movement converter 116*b*, via which the further electrical potential is transmitted to the further tool piece 94*b*, are identical.

The movement converter 116*b* is embodied electrically conductive in part. For this purpose, the movement converter 116*b* comprises metal, at least in part. The movement converter 116*b* is partially embodied from a further insulating material. The further insulating material has a CTI value of at least 150. In the present case, the further insulating material even has a CTI value greater than 600. The further insulating material can be PEEK, for example. In the present case, the further insulating material is a cycloolefin copolymer (COC) and/or polymethylpentene. Only components of the movement converter 116*b* which are designed to transmit movement from the actuating unit 106*b* to the tool piece 92*b* are at least partially free of an insulating material for transmitting the electrical potential. Only components of the movement converter 116*b* which are designed to transmit movement from the actuating unit 106*b* to the further tool piece 94b are at least partially free of an insulating material for transmitting the further electrical potential.

For an electrical connection, a thrust and/or traction piston 122b of the movement converter 116b has at least one electrical pole conductor extension 194a. The electrical pole conductor extension 194b is electrically connected to the electrical pole conductor 184b of the actuating unit 106b. Furthermore, the electrical pole conductor extension 194b is mechanically connected to the electrical pole conductor 184b of the actuating unit 106b.

Part of the electrical pole conductor extension 194b extends through an anchor 130b of the thrust and/or traction piston 122b. In the region of the anchor 130b, the electrical pole conductor extension 194b is electrically and/or mechanically connected to a further component of the movement converter 116b. Furthermore, at least part of the electrical pole conductor extension 194b extends through a pin 124b of the thrust and/or traction piston 122b. In the region of the pin 124b, the electrical pole conductor extension 194b is electrically connected to the electrical pole conductor 184b.

The electrical pole conductor extension 194b has an electronic pole conductor extension base body 202. The electrical pole conductor extension 194b has a pole conductor sleeve 198b. The electrical pole conductor extension 194b is enclosed in the pole conductor sleeve 198b. The pole conductor sleeve 198b is arranged in the region of the pin 124b of the thrust and/or traction piston 122b. The pole conductor sleeve 198b is securely connected to a pole conductor extension base body 202b of the electrical pole conductor extension 194b. In the present case, the pole conductor sleeve 198b is welded to the pole conductor extension base body 202b.

The electrical pole conductor extension 194b is embodied at least in part as a flat strip. The pole conductor extension base body 202b is embodied as a flat strip. At least part of the electrical pole conductor extension 194b is embodied from metal. The pole conductor extension base body 202b can be sheet metal, for example.

The electrical pole conductor extension 194b is hook-shaped in a side view. The electrical pole conductor extension 194b surrounds, at least in part, an additional slotted guide 176b of the thrust and/or traction piston 122b. The electrical pole conductor extension 194b is embodied, at least in part, as a sheet metal component, in particular a laser cutting sheet metal component. The pole conductor extension base body 202b is a sheet metal component, in particular a laser cutting sheet metal component. Alternatively, the electronic pole conductor extension could be an at least partially generatively manufactured component. For example, the electrical pole conductor extension could be produced by means of a laser melting and/or laser sintering process.

Furthermore, the thrust and/or traction piston 122b has at least the further insulating material. The electrical pole conductor extension 194b is covered, at least in part, with the further insulating material. In the present case, the electrical pole conductor extension 194b is even covered with the further insulating material, at least to a large extent. In the present case, the further insulating material sheathes the electrical pole conductor extension 194b. The electronic pole conductor extension 194b covered with the further insulating material forms, at least in part, the thrust and/or traction piston 122b.

For a further electrical connection, the thrust and/or traction piston 122b of the movement converter 116b has at least one further electrical pole conductor extension 196b. The further electrical pole conductor extension 196b is electrically connected to the further electrical pole conductor 186b of the actuating unit 106b. Furthermore, the further electrical pole conductor extension 196b is mechanically connected to the further electrical pole conductor 186b of the actuating unit 106b.

At least part of the further electrical pole conductor extension 196b extends through the anchor 130b of the thrust and/or traction piston 122b. In the region of the anchor 130b, the further electrical pole conductor extension 196b is electrically and/or mechanically connected to a further component of the movement converter 116b. Furthermore, at least part of the further electrical pole conductor extension 196b extends through the pin 124b of the thrust and/or traction piston 122b. In the region of the pin 122b, the further electrical pole conductor extension 196b is electrically connected to the further electrical pole conductor 186b.

The further electrical pole conductor extension 196b has a further pole conductor extension base body 204b. The further electrical pole conductor extension 196b has a further pole conductor sleeve 198b. The further electrical pole conductor 186b is enclosed in the further pole conductor sleeve 200b. The further pole conductor sleeve 200b is arranged in the region of the pin 124b of the thrust and/or traction piston 122b. The further pole conductor sleeve 200b is securely connected to a further pole conductor extension base body 204b of the further electrical pole conductor extension 196b. In the present case, the further pole conductor sleeve 200b is welded to the further pole conductor extension base body 204b.

At least part of the further electrical pole conductor extension 196b is embodied as a flat strip. The further pole conductor extension base body 204b is embodied as a flat strip. The further electrical pole conductor extension 196b is embodied, at least in part, from metal. The additional pole conductor extension base body 204b can be, for example, sheet metal.

At least part of the further electrical pole conductor extension 196b is embodied as a sheet metal component, in particular a laser cutting sheet metal component. The further pole conductor extension base body 204b is a sheet metal component, in particular a laser cutting sheet metal component. Alternatively, the further electrical pole conductor extension could be an at least partially generatively manufactured component. For example, the further electrical pole conductor extension could be produced by means of a laser melting and/or laser sintering process.

Furthermore, the thrust and/or traction piston 122b has at least one further insulating material. In the present case, it is the aforementioned further insulating material. The further electrical pole conductor extension 196b is covered, at least in part, with the further insulating material. In the present case, the further electrical pole conductor extension 196b is even covered with the further insulating material, at least to a large extent. In the present case, the further insulating material sheathes the further electrical pole conductor extension 196b. The further electrical pole conductor extension 196b covered with the further insulating material is embodied, at least in part, by the thrust and/or traction piston 122b.

In a side view, the further electrical pole conductor extension 196b is embodied corresponding to the electrical pole conductor extension 194b. The further electrical pole conductor extension 196b extends at least substantially parallel to the electrical pole conductor extension 194b. The electrical pole conductor extension 194b and the further electrical pole conductor extension 196b are arranged in the same plane. The plane can be a plane of symmetry of the thrust and/or traction piston 122b. The electrical pole conductor extension 194b surrounds, at least in part, the further electrical pole conductor extension 196b.

In the present case, the further insulating material sheathes the electrical pole conductor extension 194b and the further electrical pole conductor extension 196b. The electrical pole conductor extension 194b and the further electrical pole conductor extension 196b are electrically insulated from one another by the further insulating material. The further insulating material, the electrical pole conductor extension 194b, and the further pole conductor extension 196b form the thrust and/or traction piston 122b, at least to a large extent.

The movement converter 116b has at least one pivot lever 132b. The pivot lever 132b is electrically connected to the thrust and/or traction piston 122b. The pivot lever 132b is electrically connected to the electrical pole conductor extension 194b. The pivot lever 132b has a pivot lever base body 134b. At least part of the pivot lever base body 134b is embodied from metal. The pivot lever base body 134b is electrically connected to the tool piece 92b. The pivot lever 132b has at least one further insulating material. In the present case, it is the aforementioned further insulating material. At least part of the pivot lever base body 134b is covered by the further insulating material. In the present case, the pivot lever base body 134b is covered with the further insulating material, at least to a large extent.

The movement converter 116b comprises at least one coupling mechanism 136b. The coupling mechanism 136b has at least one coupling element 138b. The coupling element 138b is part of the thrust and/or traction piston 122b. The coupling element 138b is embodied electrically conductive. At least part of the coupling element 138b is embodied from metal. The coupling element 138b is free, at least in part, of the further insulating material which surrounds the thrust and/or traction piston 122b. Furthermore, the coupling element 138b is mechanically operatively connected to the electrical pole conductor extension 194b. The coupling element 138b is electrically operatively connected to the electrical pole conductor extension 194b. For example, the coupling element 138b can be welded to the electrical pole conductor extension 194b.

The coupling mechanism 136b has at least one corresponding coupling element 140b. The corresponding coupling element 140b is part of a pivot lever 132b of the movement converter 116b. The corresponding coupling element 140b is connected to a pivot lever base body 134b of the pivot lever 132b. The corresponding coupling element 140b is free, at least in part, of the further insulating material. The coupling element 138b and the corresponding coupling element 140b are electrically operatively connected to one another. The surfaces of the coupling element and the corresponding coupling element 140b which are positioned against one another and which are advantageously free of the further insulating material form an electrical sliding contact.

The movement converter 116b has at least one further pivot lever 150b (see FIG. 9). The further pivot lever 150b is electrically connected to the thrust and/or traction piston 122b. The further pivot lever 150b is electrically connected to the further electrical pole conductor extension 196b. The further pivot lever 150b has a further pivot lever base body 152b. The further pivot lever base body 152b is embodied, at least in part, from metal. The further pivot lever base body 152b is electrically connected to the tool piece 92b. The further pivot lever 150b has at least one further insulating material. In the present case, this is the aforementioned further insulating material. At least part of the further pivot lever base body 152b is covered by the further insulating material. In the present case, the further pivot lever base body 152b is covered with the further insulating material, at least to a large extent.

The coupling mechanism 136b has at least one further coupling element 156b. The further coupling element 156b is part of the thrust and/or traction piston 122b. The further coupling element 156b is embodied electrically conductive. At least part of the further coupling element 156b is embodied from metal. The further coupling element 156b of the thrust and/or traction piston 122b is free, at least in part, of the further insulating material. The further coupling element 156b is electrically operatively connected to the further electrical pole conductor extension 196b. Furthermore, the further coupling element 156b is mechanically operatively connected to the further electrical pole conductor extension 196b. For example, the further coupling element 156b is welded to the further electrical pole conductor extension 196b.

The coupling mechanism 136b has at least one further corresponding coupling element 158b. The corresponding coupling element 158b is part of the further pivot lever 150b. The further corresponding coupling element 158b is connected to a further pivot lever base body 152b of the further pivot lever 150b. The further corresponding coupling element 158b is free, at least in part, of the further insulating material. The further coupling element 156b and the further corresponding coupling element 158b are electrically operatively connected to one another. Surfaces of the further coupling element 156b and the further corresponding coupling element 158b which are positioned against one another and which are advantageously free of the further insulating material form an electrical sliding contact.

Furthermore, the end effector 90b has an end effector head 96b. At least part of the end effector head 96b is embodied from a further insulating material, for example the aforementioned further insulating material. The end effector head 96b has an end effector base body 206b. In the present case, the end effector base body 206b is embodied, at least in part, from a metal. The end effector base body 206b is covered with the further insulating material, at least to a large extent. In the present case, the end effector base body 206b is completely covered with the further insulating material.

Components of the endoscopic device 16b covered with the further insulating material are covered therewith in a seamless manner. For this purpose, the basic bodies of these components, such as, for example, the end effector head, the end effector fork, the thrust and/or traction piston, the pivoting lever, the further pivoting lever, and the like, are coated with the further insulating material. The further insulating material is positioned flush against further components, such as the tool piece, so that it is advantageously possible to prevent seams in which contaminants could accumulate.

FIG. 10 is a schematic sectional illustration of at least a part of an alternative endoscopic device 16c along a shaft 26c of the endoscopic device 16c according to the principles of the present disclosure in a sectional view along a shaft 26c of the endoscopic device 16c in a linear configuration. Furthermore, FIG. 11 is a schematic sectional illustration of at least a part of the endoscopic device 16c along the shaft 26c of the endoscopic device 16c in a deflection configuration. The present exemplary embodiment of the endoscopic device 16c is distinguished from the preceding exemplary embodiment essentially by a deflection mechanism 46c of the endoscopic device 16c.

The deflection mechanism 46c has at least one first connecting link 48c. In the present case, the deflection mechanism 46c has a plurality of first connecting links. Furthermore, the deflection mechanism 46c has at least one second connecting link 50c. In the present case, the deflection mechanism 46c has a plurality of second connecting links.

In FIG. 10, the deflection mechanism 46c is shown in a linear configuration. The first connecting link 48c and the second connecting link 50c are arranged in a linear configuration relative to one another. In the linear configuration, a first rotational symmetry axis 52c of the first connecting link 48c and a second rotational symmetry axis 54c of the second connecting link 50c are oriented at least substantially parallel to one another.

The first connecting link 48c has a first geometric center point 64c. Furthermore, the second connecting link 50c has a second geometric center point 66c. In the linear configuration, the first geometric center point 64c and the second geometric center point 66c are arranged offset to one another.

If the first connecting link 48c and the second connecting link 50c are arranged in the linear configuration, there is a linear configuration distance 68c between the first connecting link 48c and the second connecting link 50c. In the linear configuration, the linear configuration distance 68c is defined by a shortest connection between the first geometric center point 64c and the second geometric center point 66c.

FIG. 11 illustrates the deflection mechanism 46c in a deflection configuration. The first connecting link 48c and the second connecting link 50c are arranged in a deflection configuration relative to one another. In the deflection configuration, the first rotational symmetry axis 52c of the first connecting link 48c and the second rotational symmetry axis 54c of the second connecting link 50c are arranged at an angle to one another. In the deflection configuration, an angle between the first rotational symmetry axis 52c and the second rotational symmetry axis 54c is at least 10° relative to one another. In the deflection configuration, the first geometric center point 64c and the second geometric center point 66c are arranged offset to one another.

If the first connecting link 48c and the second connecting link 50c are arranged in the deflection configuration, there is a deflection distance 70c between the first connecting link 48c and the second connecting link 50c. In the deflection configuration, the deflection distance 70c is defined by a shortest connection between the first geometric center point 64c and the second geometric center point 66c. The deflection configuration distance 70c is greater than the linear configuration distance 68c.

When the first connecting link 48c and the second connecting link 50c are deflected relative to one another, as can occur, for example, when the connecting links are moved from the linear configuration to the deflection configuration, they are designed such that their geometric center points 64c, 66c per degree of deflection from the linear configuration increases by at least 0.3 μm. In the deflection configuration there is an extension of the deflection mechanism 46c in comparison to the linear configuration. If the connecting links 48c, 50c are under prestress, such as, for example, by a control element of the endoscopic device 16c, the prestress increases in the deflection configuration in comparison to a prestress which acts on the connecting links in the linear configuration. A restoring effect can be achieved, whereby the connecting links return automatically to a linear configuration.

In the present case, the deflection mechanism 46c has three first connecting links 48c. Furthermore, the deflection mechanism 46c has four second connecting links 50c. The arrangement of the plurality of first connecting links and the plurality of second connecting links thus results in a total of six cooperating combinations of a first connecting link and a second connecting link.

The first connecting link 48c has at least one outer contour 72c. The outer contour 72c faces outwards. The outer contour 72c is not embodied concave. In the present case, the outer contour 72c is convex. The outer contour 72c describes a circular arc 76c. The outer contour 72c has, at least in segments, a shape of a circular involute. As an alternative or in addition, the outer contour could be embodied, at least in segments, corresponding to a shape of a circular arc, a cycloid, a paraboloid, and/or an ellipsoid.

There is a diameter 74c of a smallest imaginary circular arc 76c that still completely encloses the outer contour 72c of the first connecting link 48c. This diameter 74c is greater than a maximum connecting link width 208c of the first connecting link 48c. The connecting link width 208c is measured at least substantially perpendicular to the longitudinal direction 38c of a shaft 26c of the endoscopic device 16c.

The second connecting link 50c has at least one inner contour 78c. The inner contour 78c faces inwards. The inner contour 78c is not embodied concave. Furthermore, the inner contour 78c is linear in the present case. The inner contour 78c is embodied different from an arc 76c, at least in segments. Alternatively or in addition, the inner contour could be embodied, at least in sections, corresponding to a shape of a circular arc, a circular involute, a cycloid, a paraboloid, and/or an ellipsoid.

The outer contour 72c and the inner contour 78c are disposed opposing one another. The inner contour 78c of the second connecting link 50c is designed to cooperate with the outer contour 72c of the first connecting link 48c and vice versa. The outer contour 72c and the inner contour 78c are positioned against one another at most in segments.

FIG. 12 is a schematic perspective elevation of at least part of a further exemplary embodiment of a further endoscopic device 16d in an assembled state according to the principles of the present disclosure. Furthermore, FIGS. 13 and 14 illustrate further assembly states of the endoscopic device 16d. The present exemplary embodiment of the endoscopic device 16d differs from that in the forgoing essentially through a deflection mechanism 46d of the endoscopic device 16d.

The deflection mechanism 46d has at least one control element 80d. The control element 80d is connected to an end segment 28d of the shaft 26d. A part of the control element 80d is arranged in the region of the end segment 28d of the shaft 26d, embodying a loop 84d. The loop 84d has a loop radius 212d. The loop radius 212d is greater than a diameter 74d of the control element 80d. The loop radius 212d is at least twice the diameter 74d of the control element 80d.

The end segment 28d of the shaft 26d has at least one loop guide 210d. At least part of the control element 80d is arranged in the loop guide 210d. A segment of the control element 80d embodying loop 84d is arranged in the loop guide 210d. In a side view, the loop guide 210d has a keyhole-like contour. In front of the loop 84d, a loop guide 210d guides the control element 80d towards the end segment 28d of the shaft 26d. After the loop 84d, the loop guide 210d again guides the control element 80d towards the end segment 28d of the shaft 26d.

The loop guide 210d guides the control element 80d, at least in segments, substantially parallel to a primary extension axis 120d of the shaft 26d. There is a tiny distance between a segment guided to the loop 84d and a segment of the control element 80d guided back from the loop 84d. This tiny distance is smaller than a doubled loop radius 212d of the loop 84d or loop guide 210d.

The loop guide 210d has a circumferential extension angle 214d. The circumferential extension angle 214d is an angle which describes the radial angle component of the loop 84d. The circumferential extension angle 214d is greater than 180°. In the present case, the circumferential extension angle 214d is at least 210°. Furthermore, the circumferential extension angle 214d is an angle of less than 360°. In the present case, the circumferential extension angle 214d is at most 340°.

The loop guide 210d is open radially outward for radially inserting the control element 80d therein. Alternatively, the loop guide could be open inward. It is also possible for the loop guide to be covered radially outward by means of a cover. For this purpose, it could be possible to couple a cover to an end segment of a shaft. The cover covers, at least in part, an end segment 28d of the shaft 26d can be coupled in order to radially close the loop guide 210d from the outside.

Furthermore, the end segment 28d has a plurality of loop guides 210d which are arranged offset to one another along the circumference of the shaft 26d. Of the plurality of loop guides, for the sake of clarity only the loop guide 210d is provided with a reference symbol. A plurality of control elements is arranged in the plurality of loop guides. One control element 80d each is arranged in one of the plurality of loop guides.

FIG. 13 is a schematic perspective elevation of at least a part of an additional endoscopic device 16e in an assembled state according to the principles of the present disclosure. FIG. 14 is a schematic perspective elevation of the part of the endoscopic device 16e in an additional assembly state. FIG. 25 is further a schematic perspective elevation of at least the part of the further endoscopic device 16e in an assembled state. The present exemplary embodiment of the further endoscopic device 16e is distinguished from those in the foregoing essentially by a deflection mechanism 46e of the endoscopic device 16e.

The deflection mechanism 46e has at least one first connecting link 48e. Furthermore, the deflection mechanism 46e has at least one second connecting link 50e.

The second connecting link 50e has at least one through-guide 82e. Furthermore, the second connecting link 50e has at least one radial opening 216e. The radial opening 216e is connected to the through-guide 82e. A control element 80e can be inserted into the through-guide 82e via the radial opening 216e.

The second connecting link 50e has at least one connecting link base body 218e. The connecting link base body 218e has the radial opening 216e. Furthermore, the connecting link base body 218e has the through-guide 82e. The connecting link base body 218e has a connecting recess 220e. The connecting recess 220e runs radially, at least in segments. In the present case, the connecting recess 220e runs entirely radially. The connecting recess 220e of the connecting link base body 218e connects the through-guide 82e and the radial opening 216e to one another.

The second connecting link 50e has at least one closure body 222e. The closure body 222e is designed to close the radial opening 216e, at least in an inserted state of the control element 80e. In the present case, the closure body 222e is embodied as a clamping ring. The closure body 222e can be connected to the connecting link base body 218e. In the present case, the closure body 222e can be connected to the connecting link base body 218e in a non-positive and/or positive fit. Furthermore, the closure body 222e is connected to the connecting link base body 218e in a bonded fit or can be welded thereto.

FIG. 16 is a schematic plan view of at least a part of an alternative endoscopic device 16f according to the principles of the present disclosure. The present exemplary embodiment of the endoscopic device 16f is distinguished from that in the foregoing essentially in the embodiment of a deflection mechanism 46f of the endoscopic device 16f.

A second connecting link 50f of the deflection mechanism 46f has at least one connecting link base body 218f. The connecting link base body 218f has at least one through-opening 82f. Furthermore, the connecting link base body 218f has at least one radial opening 216f. Furthermore, the connecting link base body 218f has a connecting recess 220f. The connecting recess 220f connects the radial opening 216f to the through-guide 82f.

In the present case, the connecting recess 220f runs radially in segments. The connecting recess 220f describes a curved path. In the present case, the radially running recess describes a hook-shaped curved path. The connecting recess 220f has the shape of a curved path. The curved path has a curved path angle greater than 90°. In the present case, the curved path has a curved path angle greater than 150°. Furthermore, the curved path angle is a maximum of 180°. Advantageously, a closure body according to the previous embodiment is not required here.

FIG. 17 is a schematic perspective elevation of at least a part of an alternative endoscopic device 16g according to the principles of the present disclosure. The present exemplary embodiment is distinguished from those in the foregoing essentially by an embodiment of a deflection mechanism 46g of the endoscopic device 16g.

A second connecting link 50g of the deflection mechanism 46g has at least one connecting link base body 218g. The connecting link base body 218g has at least one through-guide 82g. Furthermore, the connecting link base body 218g has at least one radial opening 216g. Furthermore, the connecting link base body 218g has a connecting recess 220g. The connecting recess 220g connects the radial opening 216g to the guide hole.

In the present case, the radial opening 216g runs at an angle to a rotational symmetry axis of the second connecting link. Furthermore, the radial opening 216g can have a curve-like course. For example, in such a course, a continuous course can roughly correspond to a cosine wave.

FIG. 18 is a schematic perspective elevation of at least a part of an alternative endoscopic device 16h in an assembly state according to the principles of the present disclosure. FIG. 19 is a schematic perspective elevation of the part of the endoscopic device 16h in an assembled state. Furthermore, FIG. 20 is a schematic perspective elevation of the part of the endoscopic device 16h in an assembly state. In addition, FIG. 21 is a schematic perspective elevation of the part of the endoscopic device 16h in a further assembly state. FIG. 22 is a schematic perspective elevation of at least the part of the endoscopic device 16h in an assembled state. The present exemplary embodiment of the endoscopic device 16h is distinguished from those in the foregoing essentially by an embodiment of a deflection mechanism 46h of the endoscopic device 16h.

The deflection mechanism 46h has a second connecting link 50h. The connecting link 50h comprises at least one connecting link base body 218h. The connecting link base body 218*h* has at least one through-guide 82*h*. Furthermore, the connecting link base body 218*h* has a radial opening 216*h*. Furthermore, the connecting link base body 218 comprises a connecting recess 220*h*. The connecting recess 220*h* connects the radial opening 216*h* to the through-guide 82*h*.

A second connecting link has at least one further connecting link base body 224*h*. The further connecting link base body 224*h* has at least one further through-guide 226*h*. In the present case, the connecting link base body 218*h* and the further connecting link base body 224*h* are at least embodied substantially identical to one another. Furthermore, the further connecting link base body 224*h* has a further radial opening 228*h*. Furthermore, the further connecting link base body 224*h* comprises a further connecting recess 230*h*. The further connecting recess 230*h* connects the further radial opening 228*h* to the further through-guide 226*h*.

The connecting link base body 218*h* and the further connecting link base body 224*h* can be coupled to one another. The connecting link base body 218*h* and the further connecting link base body 224*h* can be connected to one another in a non-positive and/or positive fit. In a configuration in which a radial opening 216*h* of the connecting link base body 218*h* and the further radial opening 228*h* of the further connecting link base body 224*h* are congruent with one another, the connecting link base body 218*h* and the further connecting link base body 224*h* are separated from one another.

In a further configuration in which the through-guide 82*h* of the connecting link base body 218*h* and the further through-guide 226*h* of the further connecting link base body 224*h* are congruent with one another, the connecting link base body 218*h* and the further connecting link base body 224*h* can be connected to one another. In an assembled state, a control element 80*e* of the deflection mechanism 46*h* holds the connecting link base body 218*h* and the further connecting link base body 224*h* under prestress, so that they are pressed together. Alternatively or in addition, it could be possible to connect the connecting link base bodies by means of a quick connector 248*h*, such as, for example, a bayonet lock, a screw lock, or the like.

FIG. 23 is a schematic side view of at least a part of an alternative endoscopic device 16*i* in a linear configuration according to the principles of the present disclosure. Furthermore, FIG. 24 is a schematic sectional illustration of the part of the endoscopic device 16*i* from FIG. 23 along a shaft 26*i* of the endoscopic device 16*i* in the linear configuration. FIG. 25 is a schematic side view of the part of the endoscopic device 16*i* in a deflection configuration. FIG. 26 is a schematic sectional illustration of the part of the endoscopic device 16*i* along the shaft 26*i* of the endoscopic device 16*i* in the deflection configuration. The present exemplary embodiment of the endoscopic device 16*i* is distinguished from those in the foregoing essentially by a deflection mechanism 46*i* of the endoscopic device 16*i*.

The deflection mechanism 46*i* has at least one first connecting link 48*i*. In the present case, the deflection mechanism 46*i* has a plurality of first connecting links. Furthermore, the deflection mechanism 46*i* has at least one second connecting link 50*i*. In the present case, the deflection mechanism 46*i* has a plurality of second connecting links.

At least part of the first connecting link 48*i* is embodied from a first material 232*i*. The first material 232*i* is assigned to the substance group of plastics. In the present case, the first material 232*i* is an elastomer. The first material 232*i* has a first elasticity.

At least part of the second connecting link 50*i* is embodied from a second material 234*i*. The second material 234*i* is assigned to the substance group of plastics. The second material 234*i* is a thermoplastic. Alternatively, the second material could also be a metal, a ceramic, or the like.

The second material 234*i* has a second elasticity. The second elasticity of the second material 234*i* differs from the first elasticity of the first material 232*i*. In the present case, an elasticity of the first material 232*i* is greater than an elasticity of the second material 234*i*.

At least part of the second connecting link 50*i* is arranged coaxially surrounding the first connecting link 48*i*. The first connecting link 48*i* is embodied in a tube-like manner. The second connecting link 50*i* is embodied in an annular shape.

The first connecting link 48*i* and the second connecting link 50*i* are connected to one another at least in a positive fit. The first connecting link 48*i* and the second connecting link 50*i* engage in one another, at least in part, in an engagement region 236*i*. The first connecting link 48*i* has a first profile element 238*i* for connecting it to the second connecting link 50*i*. In the present case, the profile element 238*i* has the shape of an undulation. The second link 50*i* has a second profile element 240*i* for connecting to the first connecting link 48*i*. The second profile element 240*i* is embodied corresponding to the first profile 238*i*. For an at least positive fit connection of the first connecting link 48*i* and the second connecting link 50*i*, the first profiling element 238*i* and the second profiling element 240*i* engage in one another and embody the engagement region 236*i*.

Furthermore, the first connecting link 48*i* and the second connecting link 50*i* are at least connected to one another in a bonded fit. For example, the first connecting link 48*i* and the connecting second link 50*i* could be glued together. In the present case, however, the first connecting link 48*i* and the second connecting link 50*i* are overmolded with one another. In this way, at least the first connecting link 48*i* and the second connecting link 50*i* embody, at least in part, a multi-component injection molding assembly 242*i* of the endoscopic device 16*i*.

In the present case, the plurality of first connecting links are embodied in one piece with one another. The plurality of first connecting links together form a tube. The main extension of the tube corresponds at least essentially to a main extension of a deflection mechanism 46*i* of the endoscopic device 16*i*. The plurality of second connecting links are then each offset to one another about the tube. Together, the plurality of first connecting links and the plurality of second connecting links thus embody the multi-component injection molding assembly 242*i*.

FIG. 27 is a schematic perspective elevation of at least part of a further endoscopic device 16*j* according to the principles of the present disclosure. The present exemplary embodiment of the endoscopic device 16*j* is distinguished from those in the foregoing essentially by a modular structure of the endoscopic device 16*j*.

The endoscopic device 16*j* has at least one end effector module 244*j*. The end effector module 244*j* comprises at least one end effector 90*j*. Furthermore, the end effector module 244*j* has an actuating unit 106*j*. In addition, the end effector module 244*j* has a movement converter 116*j*. The end effector module 244*j* is embodied as a reusable module. For example, the end effector module 244*j* is designed so that it is autoclavable so that it can be cleaned after an intervention and thus used multiple times. Alternatively, the end effector module could be designed as a single-use module. For example, the end effector module could be designed not for an autoclaving process. It would be possible for the single-use module to have an intentional defect when re-use is attempted, which defect prevents functioning or detects and indicates re-use.

The endoscopic device 16*j* further comprises at least one shaft module 246*j*. The shaft module 246*j* has at least the shaft 26*j*. Furthermore, the shaft module 246*j* has a deflection mechanism 46*j*. The shaft module 246*j* is embodied as a single-use module. For example, the shaft module 246*j* could be designed not for an autoclaving process. It would be possible for the single-use module to have an intentional defect when re-use is attempted, which defect prevents functioning or detects and indicates re-use. Alternatively, the shaft module could be designed as a reusable module. For example, the shaft module is designed so that it can be autoclaved so that it can be cleaned after an intervention and thus used several times. Furthermore, the shaft module 246*j* can have all components of the endoscopic device 16*j* which are not already allocated to the end effector module 244*j*.

The end effector module 244*j* and the shaft module 246*j* can be exchangeably connected to one another. The endoscopic device 16*j* comprises at least one quick connector 248*j*. In the present case, the quick connector 248*j* is embodied as a screw connector. Alternatively, the quick connector could also be a snap-on connection, clamp connection, bayonet connection, or the like.

The quick connector 248*j* has a quick connector piece 250*j*. Furthermore, the quick connector 248*j* has a quick connector piece 252*j* corresponding to the quick connector piece 250*j*. In the present case, the quick connector piece 250*j* is a threaded piece. The quick connector piece 250*j* has a female thread. In the present case, the corresponding quick connector piece 252*j* is a corresponding threaded piece. The corresponding quick connector piece 252*j* has a male thread.

At least part of the quick connector 248*j* is connected by the end effector 90*j* in one piece. An end effector head 96*j* of the end effector 90*j* is embodied in one piece with the quick connector 248*j*. In the present case, the end segment 28*j* of the shaft 26*j* has the corresponding quick connector piece 252*j*. Furthermore, the quick connector 248*j* is at least partially embodied from an end effector head 96*j* of the end effector 90*j*. In the present case, the end effector head 96*j* has the corresponding quick connector piece 252*j*.

In order to achieve exchangeability and thus greater versatility, the endoscopic device 16*j* has at least one or a plurality of further end effector modules. Furthermore, the endoscopic device 16*j* can have at least one or a plurality of further shaft modules 246*j*.

| | | | |
|---|---|---|---|
| 10 | Surgical system | 66 | Second geometric center point |
| 12 | Surgical robot | 68 | Linear configuration distance |
| 14 | Control device | 70 | Deflection configuration distance |
| 16 | Endoscopic device | 72 | Outer contour |
| 18 | Robot arm | 74 | Diameter |
| 20 | Endoscopic instrument | 76 | Circular arc |
| 22 | Endoscope | 78 | Inner contour |
| 26 | Shaft | 80 | Control element |
| 28 | End segment | 82 | Through-guide |
| 30 | Further end segment | 84 | Loop |
| 32 | Center segment | 86 | Element receptacle |
| 34 | Basic structure | 88 | Through-guide |
| 36 | Shaft jacket | 90 | End effector |
| 38 | Longitudinal direction | 92 | Tool piece |
| 40 | Longitudinal extension | 94 | Further tool piece |
| 42 | Deflectable segment | 96 | End effector head |
| 44 | Plane | 98 | End effector fork |
| 46 | Deflection mechanism | 100 | End effector leg |
| 48 | First connecting link | 102 | Further end effector leg |
| 50 | Second connecting link | 104 | End effector socket |
| 52 | First rotational symmetry axis | 106 | Actuating unit |
| 54 | Second rotational symmetry axis | 108 | Flexible segment |
| 56 | Collar | 110 | Inflexible segment |
| 58 | Further collar | 112 | Inner cable |
| 60 | Ball head | 114 | Reinforcement |
| 62 | Ball socket | 116 | Movement converter |
| 64 | First geometric center point | 118 | Pivot axis |
| 120 | Primary extension axis | 174 | Further slotted guide |
| 122 | Thrust and/or traction piston | 176 | Further slotted guide |
| 124 | Pin | 178 | Guide pin |
| 126 | Piston guide | 180 | Pin receiving element |
| 128 | Actuating unit receptacle | 182 | Further pin receiving element |
| 130 | Anchor | 184 | Electrical pole conductor |
| 132 | Pivot lever | 186 | Further electrical pole conductor |
| 134 | Pivot lever base body | 188 | Outer cable |
| 136 | Coupling mechanism | 190 | Electrical insulator |
| 138 | Coupling element | 192 | Further electrical insulator |
| 140 | Corresponding coupling element | 194 | Electrical pole conductor extension |
| 142 | Pivot bearing | 196 | Further electrical pole conductor extension |
| 144 | Bearing element | 198 | Pole conductor sleeve |
| 146 | Corresponding bearing element | 200 | Further pole conductor sleeve |
| 148 | Rotational axis | 202 | Pole conductor extension base body |
| 150 | Further pivot lever | 204 | Further pole conductor extension base body |
| 152 | Further pivot lever base body | 206 | End effector base body |
| 154 | Further coupling mechanism | 208 | Connecting link width |
| 156 | Further coupling element | 210 | Loop guide |
| 158 | Further corresponding coupling element | 212 | Loop radius |
| | | 214 | Circumferential extension angle |
| 160 | Further pivot axis | 216 | Radial opening |
| 162 | Further pivot bearing | 218 | Connecting link base body |
| 164 | Further bearing element | 220 | Connecting recess |
| 166 | Further corresponding bearing element | 222 | Closure body |
| 168 | Further rotational axis | 224 | Further connecting link base body |
| 170 | Guide bearing | 226 | Further through-guide |
| 172 | Slotted guide | 228 | Further radial opening |
| 230 | Further connecting recess | 244 | End effector module |
| 232 | First material | 246 | Shaft module |
| 234 | Second material | 248 | Quick connector |
| 236 | Engagement region | 250 | Quick connector piece |
| 238 | First profile element | 252 | Corresponding quick connector piece |
| 240 | Second profile element | | |
| 242 | Multi-component injection molding assembly | | |

We claim:

1. An endoscopic device comprising:
   a shaft including at least one segment which can be deflected in at least one plane;
   an end effector arranged on an end portion of the shaft and includes a first tool piece and a second tool piece;
   an actuation train that extends through the shaft and is mechanically connected to a movement converter configured translate an axial movement of the actuation train to move the first and second tool pieces between an open position, a closed position, or an intermediate position between the open and closed position, wherein the movement converter includes a thrust and/or traction piston operatively coupled to the first and second tool pieces, the actuation train including:

an inner electrical pole conductor;

an inner electrical insulator that coaxially surrounds the inner electrical pole conductor;

an outer electrical pole conductor coaxially surrounding the inner electric insulator;

a first electrical pole conductor extension electrically connecting the inner electrical conductor to the first tool piece along a first electrical path, wherein the first electrical pole conductor extension is attached to the thrust and/or traction piston; and a second electrical pole conductor extension electrically connecting the outer electrical pole conductor to the second tool piece along a second electrical path, wherein the second electrical pole conductor extension is attached to the thrust and/or traction piston and the second electrical pole conductor extension is longer than the first electrical pole conductor extension and electrically insulated from the first electrical pole conductor extension, wherein the second electrical path is different than and independent from the first electrical path so as to selectively provide electricity to the first tool piece and the second tool piece in any one of the open position, closed position and intermediate position.

2. The endoscopic device of claim 1, wherein the inner electrical pole conductor further comprises a stranded wire or a solid wire operable for mechanical force transmission.

3. The endoscopic device of claim 1, wherein the actuation train further comprises an outer electrical insulator that coaxially surrounds the outer electrical pole conductor.

4. The endoscopic device of claim 1, wherein the inner electrical insulator is disposed between the inner electrical pole conductor and the outer electrical pole conductor.

5. The endoscopic device of claim 1, wherein the outer electrical pole conductor further comprises a mesh conductor.

6. The endoscopic device of claim 1, wherein the actuation train further comprises an inflexible reinforcement that surrounds at least one segment of the inner electrical pole conductor.

7. The endoscopic device of claim 1, wherein the shaft further comprises a deflection mechanism configured to deflect the at least one segment of the shaft and a first connecting link and at least a second connecting link.

8. The endoscopic device of claim 1, wherein the first electrical pole conductor extension has a hook-shaped dimension.

9. An endoscope and/or endoscopic instrument comprising an endoscopic device according to claim 1.

10. A surgical system comprising an endoscopic device according to claim 1 and a surgical robot.

11. A method for operating and/or producing an endoscopic device according to claim 1.

* * * * *